(12) United States Patent
Pell et al.

(10) Patent No.: US 6,378,801 B1
(45) Date of Patent: Apr. 30, 2002

(54) DEVICES AND METHODS FOR ORIENTING AND STEERING IN THREE-DIMENSIONAL SPACE

(75) Inventors: Charles A. Pell; Hugh C. Crenshaw; Jason Janet, all of Durham; Mathieu Kemp, Rougemont, all of NC (US)

(73) Assignee: Nekton Technologies, Inc., Durham, NC (US)

(*) Notice: Subject to any disclaimer, the term of this patent is extended or adjusted under 35 U.S.C. 154(b) by 0 days.

(21) Appl. No.: 09/371,485

(22) Filed: Aug. 10, 1999

Related U.S. Application Data

(60) Provisional application No. 60/096,092, filed on Aug. 11, 1998.

(51) Int. Cl.[7] .............................. F41G 7/00; B63G 8/08
(52) U.S. Cl. .................... 244/3.24; 244/3.1; 114/337
(58) Field of Search ................................ 244/3.1, 3.21, 244/3.24, 82; 114/20.1, 152, 337

(56) References Cited

U.S. PATENT DOCUMENTS

| | | | |
|---|---|---|---|
| 3,802,190 A | | 4/1974 | Kaufmann .................... 60/225 |
| 4,086,841 A | | 5/1978 | MacDonald .................. 89/1.5 |
| 5,907,117 A | * | 5/1999 | Persson et al. ............... 89/1.11 |
| 5,939,665 A | * | 8/1999 | Banyopadhyay ....... 244/3.24 X |

FOREIGN PATENT DOCUMENTS

GB 2178144 A 2/1987 ........... F42B/25/24

OTHER PUBLICATIONS

PCT International Search Report for PCT/US99/18088.

\* cited by examiner

*Primary Examiner*—Robert P. Swiatek
(74) *Attorney, Agent, or Firm*—Myers Bigel

(57) ABSTRACT

A self-orienting device comprises: a housing; a sensor mounted to the housing that is sensitive to a signal field and configured to produce a signal responsive to the signal field; a translation-inducing unit associated with the housing; rotation-inducing unit attached to the housing, wherein the translation-inducing unit and the rotation-inducing unit are configured such that the housing travels along a helical trajectory having an axis and is free to rotate about the axis; and a controller operably associated with the sensor for controlling the output of at least one of the translation-inducing unit and the rotation-inducing unit, wherein the controller is configured such that it receives the signal from the sensor and, responsive to the signal, controls the output of at least one of the translation-inducing unit and said rotation-inducing unit. A device so configured can automatically orient to a signal. In this configuration, orientation is robust—wide variance in the parameters relating ω to signal intensity are tolerated. In fact, if ω changes as a function of signal intensity, then orientation to the signal is the only stable outcome. Exemplary signal fields for the device include light, magnetic fields, and gradients of temperature, chemical concentration and depth. The devices can be employed to perform such tasks as locating lost objects, identifying foreign objects, performing transect sampling, guiding munitions, disabling mines, delivering chemical agents, and the like.

38 Claims, 19 Drawing Sheets

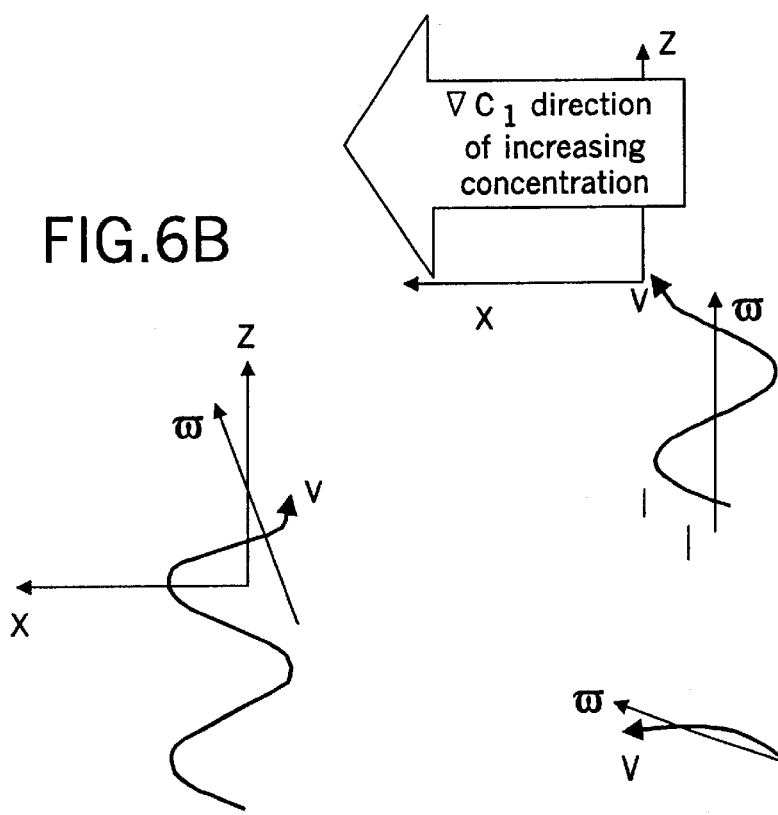
FIG.6A
FIG.6B
FIG. 6C
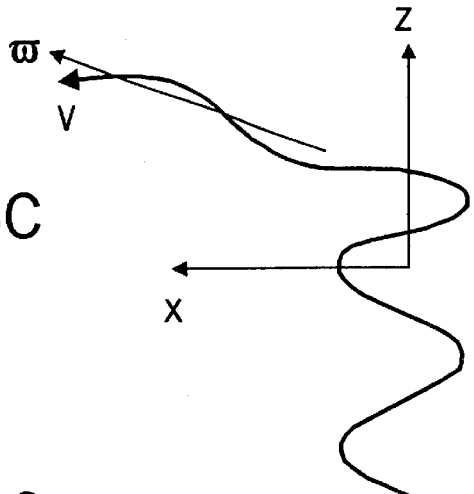
CM + MX ∇D
A new signal field can point in any chosen direction in the plane perpendicular to ∇D
FIG.10
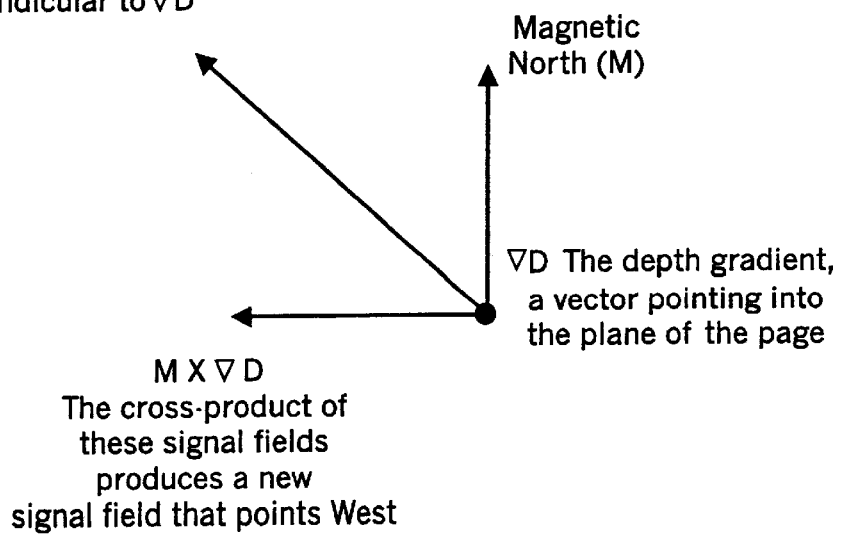
M X ∇D
The cross-product of these signal fields produces a new signal field that points West

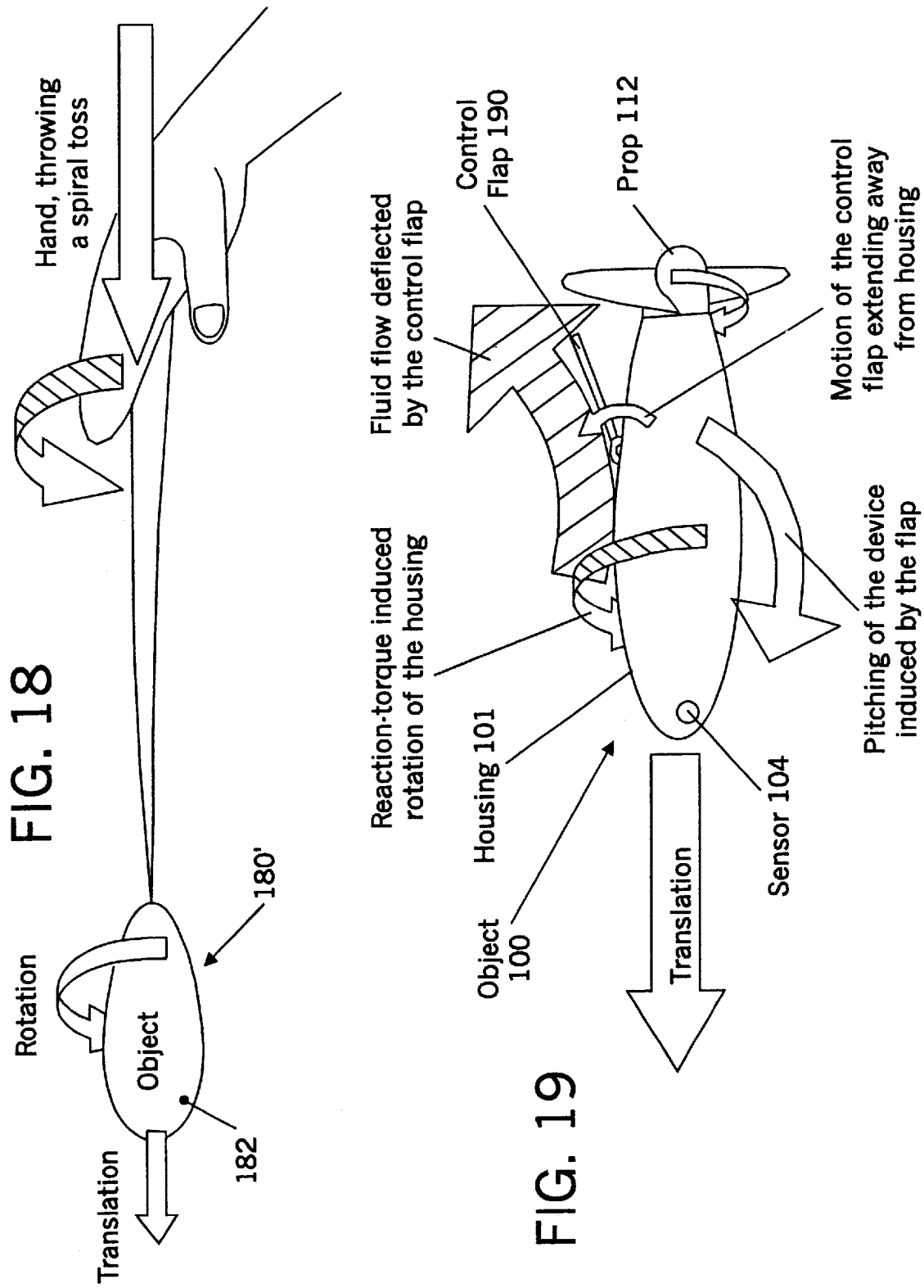

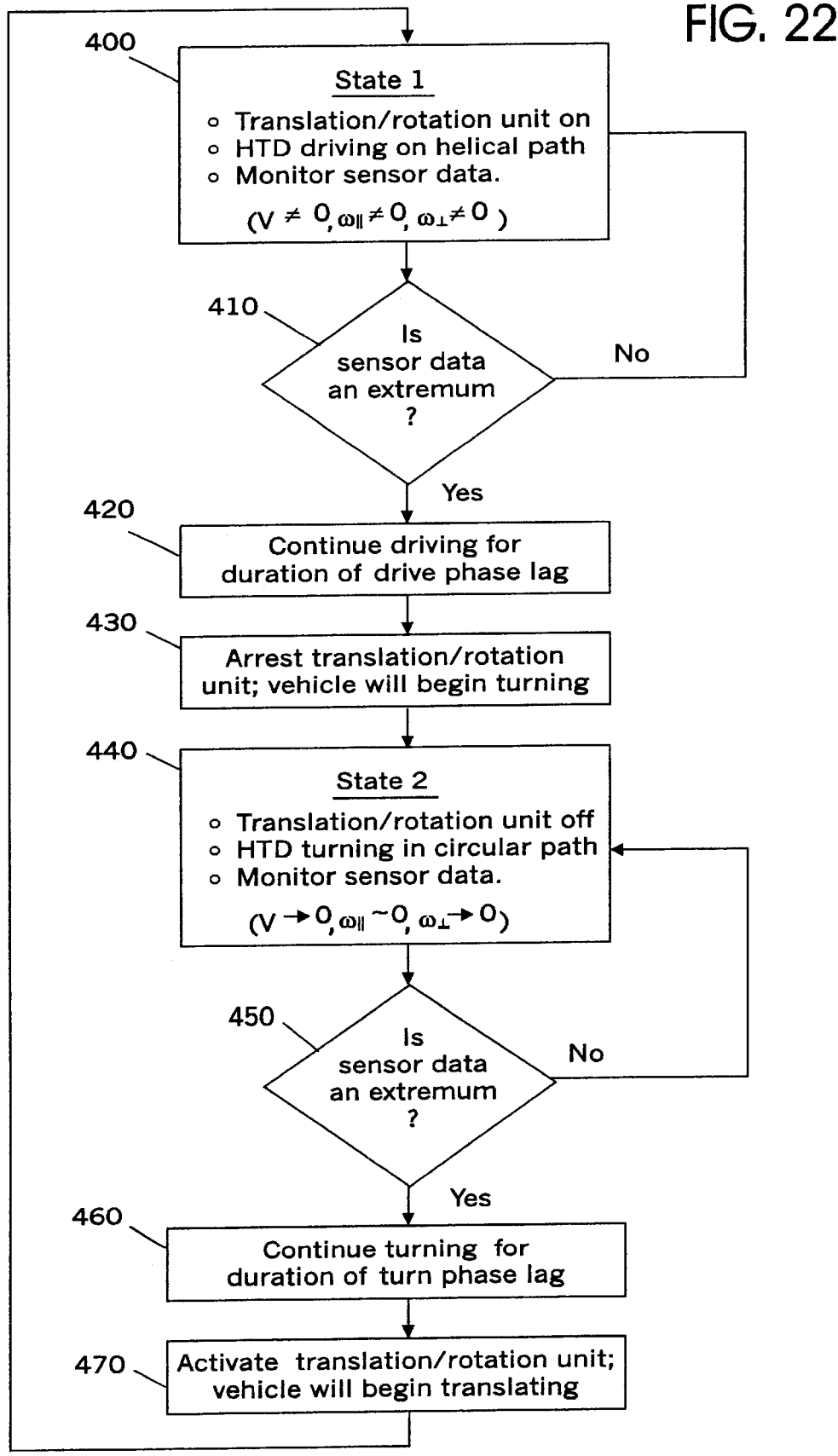

DEVICES AND METHODS FOR ORIENTING AND STEERING IN THREE-DIMENSIONAL SPACE

This application claims the benefit of U.S. Provisional Application No. 60/096,092, filed Aug. 11, 1998.

FIELD OF THE INVENTION

The present invention relates generally to the propulsion of objects in three-dimensional space, and more particularly to the self-directed propulsion of such objects.

BACKGROUND OF THE INVENTION

Since the dawn of civilization, commerce and warfare have depended critically on the travel of man and his material by land and water, and, more recently, through air and space. The evolution of manmade craft has partly reflected man's observation of swimming and flying creatures, as well as constraints he has imposed for his creature comfort. The wide variety of resulting successful designs share a common aspect; their steering or control systems are designed, in large part, to suppress angular motion such that the craft maintains an upright pose and travel is straight and level, except during the occasional turn or change in altitude. This suppression of angular motion to preserve an upright pose is frequently called "attitude control". Overturning or capsizing is usually perceived as disastrous.

Travel on land or on the surface of water is two-dimensional (2D), and simple steering devices keep travel straight while gravity and the ground reaction force or buoyancy maintain attitude control. Devices that travel in three-dimensional (3D) space, such as planes and submarines, generally require complex control systems for attitude control such that travel is straight and level. The requisite control systems and actuators (e.g. ailerons, wing flaps, trim tabs, counter-rotating propellers) typically are expensive, complex, mission-critical, subject to failure, and not readily scaleable to suit other desirable applications, such as inexpensive and robust, small, self-steering munitions. The motion and orientation of any device in three dimensional space requires the simultaneous control of six degrees of freedom—three degrees of freedom in translation and three degrees of freedom in rotation. Thus the translational velocity (V) and the rotational velocity ($\omega$) completely describe the 3D motion of any device.

In the absence of control, almost every device has a non-zero rotational velocity. For example, a person walking in a blinding snowstorm turns imperceptibly to one side, and subsequently walks in circles. For 3D motion, the default trajectory is a helix (see FIG. 1a). The magnitudes of V and $\omega$, and the angle formed by these vectors, determine the axis (K), radius (r), pitch (p), and pitch angle ($\theta$). To a first approximation, K is parallel to $\omega$, and the angle formed by V and $\omega$ equals the pitch angle ($\theta$) of the helical trajectory. For example, if $\omega$ is perpendicular to V then the resulting trajectory is a circle (pitch is zero and pitch angle is 90°—FIG. 1b). If $\omega$ is parallel to V then the resulting trajectory is straight-line motion with rotation of the device about the direction of motion (radius is zero and pitch angle is 0°—FIG. 1c). For all other angles $\theta$ between V and $\omega$ (0°<$\theta$<90°), pitch and radius are non-zero (FIG. 1a).

Importantly, the axis of the helix defines the net direction of motion. Because the axis is parallel to $\omega$, orientation of a helical trajectory requires that $\omega$, not V, be pointed in the desired direction.

Prior art solutions simplify orientation by imposing two restraints on the device's motion. The first of these restraints (identified as Restraint 1) is that one side of the device (designated the "nose") travels forward, i.e. the translational velocity V is largely restrained to one degree of freedom with respect to the body of the device. Thus, airplanes, missiles, and torpedoes all travel with their noses extending forward. Restraint 1 arises for two reasons: (a) most devices are built to go from point-to-point and, subsequently, (b) most man-made devices have thrusters that point in only one direction; e.g., the jets of a plane thrust rearward, in a direction parallel to the fuselage, and the propeller of a torpedo thrusts rearward in a direction parallel to the hull.

The second of these restraints (identified as Restraint 2) uses attitude control (described above) in which the orientation of the device is almost always restrained with respect to gravity—typically one side of the device (designated the "top") faces up with respect to gravity. Restraint 2 is required for vessels carrying people, but it is a restraint that is almost always applied to man-made devices that do not carry people, such as unmanned airplanes and unmanned submersibles. For such devices, rotation along the three degrees of rotational freedom have specific names: "yaw" for rotation about the top/bottom axis (the axis that is usually parallel to gravity); "roll" for rotation about the fore/aft axis (the axis parallel to the direction of motion); and "pitch" for rotation about the third orthogonal axis (the left/right axis). (Note that the "pitch" of a helix, p, should not be confused with the "pitch" component of rotation.)

Steering of devices using Restraints 1 and 2 is accomplished by turning, or rotating, the device to make the translational velocity V point in the desired direction of motion. For example, if a northbound device turns east, then the device must yaw, turning to starboard. The most common example is steering an airplane—yaw, pitch, and roll are permitted only during turns and only over narrow limits in normal use. After a turn the plane always returns to its original orientation with respect to gravity—with the top up and the nose forward. In between turns, the rotational velocity $\omega$ of the device is usually small; in fact, the attitude control system of the device usually strives to keep $\omega$ at or near zero to maintain orientation with respect to gravity. These are control strategies arising from the navigation of boats on the surface of water; nevertheless, other devices, like submarines and torpedoes, use similar control strategies.

Unfortunately, attitude control during periods of straight-line motion and precise control of the rotational velocity during turns require extensive and usually complex control mechanisms, including multiple sensors, actuators, control surfaces, and control circuits. Thus, control of a device in three dimensions is one of the most demanding and costly factors in design and manufacture. As such, a controllable device that lacks these complex control mechanisms would be desirable.

SUMMARY OF THE INVENTION

In view of the foregoing, it is an object of the present invention to provide a device capable of navigating in three dimensional space that operates under different restraints than Restraints 1 and 2 above.

It is also an object of the present invention to provide such a device that is self-guided.

It is an additional object of the present invention to provide such a device that lacks the complex control mechanisms of prior art devices.

These and other objects are satisfied by the present invention, which is directed to self-orienting devices and associated methods for using the same that exploit the default helical trajectory of otherwise uncontrolled devices rather than suppressing it. A self-orienting device of the present invention comprises: a housing; a sensor mounted to the housing that is sensitive to a signal field and configured to produce a signal responsive to the signal field; a translation-inducing unit associated with the housing; a rotation-inducing unit associated with the housing, wherein the translation-inducing unit and the rotation-inducing unit are configured such that the housing travels along a helical trajectory; and a controller operably associated with the sensor for controlling the output of either or both the translation-inducing unit and the rotation-inducing unit, wherein the controller is configured such that it receives the signal from the sensor and, responsive to the signal, controls the output of either or both the translation-inducing unit and the rotation-inducing unit.

Devices of the present invention travel along a helical trajectory, continuously rotating as they travel, and can self-orient in 3D by pointing the rotational velocity $\omega$ in the desired direction. Pointing $\omega$ is accomplished by making the components of $\omega$ (similar to roll, pitch, and yaw) functions of the signal to which the device is orienting, as explained later. Simple functions work well; in fact, if $\omega$ changes as almost any function of signal intensity, then orientation to the signal is the only stable outcome. Such devices have no need for the complex control systems required for attitude control, permitting orientation in 3D with relatively simple, robust, and inexpensive control systems.

In fact, self-orientation in 3D space can be accomplished using devices having only a single channel of information (one sensor, one actuator) when responding to a signal field. Exemplary signal fields include light, magnetic fields, and gradients of temperature, chemical concentration, and depth. Such devices can be employed to perform such tasks as locating lost objects, identifying foreign objects, performing transect sampling, guiding munitions, disabling mines, delivering chemical agents, and the like.

BRIEF DESCRIPTION OF THE FIGURES

FIG. 2 is a series of graphs showing the orientation of ijk with respect to body axes and the components of the translational velocity V and the rotational velocity $\omega$.

FIG. 3 illustrates the translational velocity V and the rotational velocity $\omega$ with reduced degrees of freedom.

FIG. 4 is a series of graphs that illustrate changes in the direction of the axis of the helical trajectory K caused by changes in the direction of $\omega$ with respect to V. V is constant with respect to the body of the organism ($V = V_i$). (Results from computer simulations—two perpendicular views of the 3D trajectory are presented. Reproduced from Crenshaw and Edelstein-Keshet, 1993.)

FIG. 5 schematically illustrates sensor output from a helically traveling device (HTD) equipped with a sensor and moving in a signal field.

FIG. 6 is a series of schematic diagrams illustrating the orientation of a device to a chemical concentration gradient $\nabla C$. Chemical concentration C increases in the positive X direction. In this example, $\omega_\parallel$ is proportional to C, so the angle between V and $\omega$ decreases as C increases ($\omega_\parallel$ increases, making $\omega$ align more nearly parallel to V). As shown in FIG. 6a, a device moves with the axis of its helical trajectory K initially perpendicular to $\nabla C$. As the device moves, the chemical concentration it encounters oscillates. As shown in FIG. 6b, the device begins to respond to the chemical concentration—as the device moves down the gradient, the translational velocity V is pointed down the gradient, and C decreases, so $\omega_\parallel$ decreases. The angle between V and $\omega$, therefore, increases causing $\omega$, and thus K, to become more nearly aligned with $\nabla C$. As shown in FIG. 6c, as the device turns the helix and moves back up the gradient, V points up the gradient and C increases, so $\omega_\parallel$ increases. The angle between V and $\omega$, therefore, decreases causing $\omega$, and thus K, to become further aligned with $\nabla C$.

FIG. 9 illustrates how changing the orientation of the directional sensor with respect to the axis of the helical trajectory K can reverse the device's direction of orientation. As shown in FIG. 9a, a device moves along a left-hand helical trajectory with its directional photosensor (black dot on housing of HTD) pointing away from K. The device then switches to moving along a right-hand helix (accomplished by reversing the sign of $\omega_t$), which causes the directional photosensor to now point toward K.

FIG. 10 is a graph illustrating how an HTD can be oriented to a signal field that results by combining multiple signal fields. In this example, Magnetic North M is a signal field. The depth (actually, pressure) gradient ∇D also is a signal field. A new signal field can be created by taking the cross-product M×∇D, which points West. Furthermore, a signal field can be generated for each direction of the compass in the plane perpendicular to ∇D by adding a multiple of M or of M×∇D.

FIG. 18 is a perspective view of a self-guided device of the present invention configured for launching with a human hand.

FIG. 19 is a perspective view of a self-guided device of the present invention having a with drag-producing, pitch-inducing control flap.

FIG. 21 is a series of graphs of motion capture data from tests on an M3 helically traveling device. FIG. 21a shows translational velocity V and rotational velocity ω as the propeller switches from off to on.

FIG. 22 is a flowchart of the HIWAD algorithm.

DETAILED DESCRIPTION OF THE INVENTION

The present invention now will be described more fully hereinafter with reference to the accompanying drawings, in which preferred embodiments of the invention are shown. This invention may, however, be embodied in many different forms and should not be construed as limited to the embodiments set forth herein; rather, these embodiments are provided so that this disclosure will be thorough and complete, and will fully convey the scope of the invention to those skilled in the art. Like numbers refer to like components throughout. The sizes and thicknesses of components may be exaggerated for clarity.

A. Theory Behind Helically Traveling Devices

In the discussion that follows, terms to be used in connection with the present invention are defined. The definitions are followed by an explanation of how an HTD orients to a signal field.

A.1. Definition of Terms

Figure 1A:
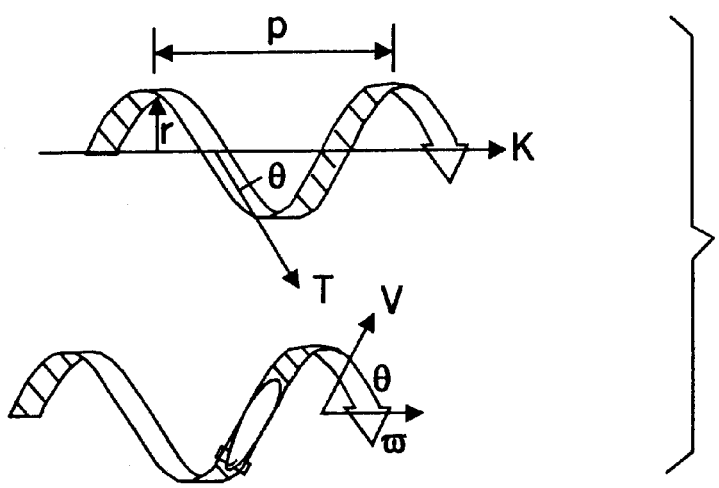
FIG. 1 is a series of diagrams showing that the angle between the translational velocity V and the rotational velocity $\omega$ affects the shape of the trajectory. If $\omega$ is neither perpendicular nor parallel to V then the trajectory is a helix: right-handed for $\omega > 0$ (a) and left-handed for $\omega < 0$ (b) (FIG. 1a). If $\omega$ is perpendicular to V, then the trajectory is a circle (FIG. 1b). If $\omega$ is parallel to V, then the trajectory is a straight line, and the object rotates around this line of motion (FIG. 1c).
Figure 1B:
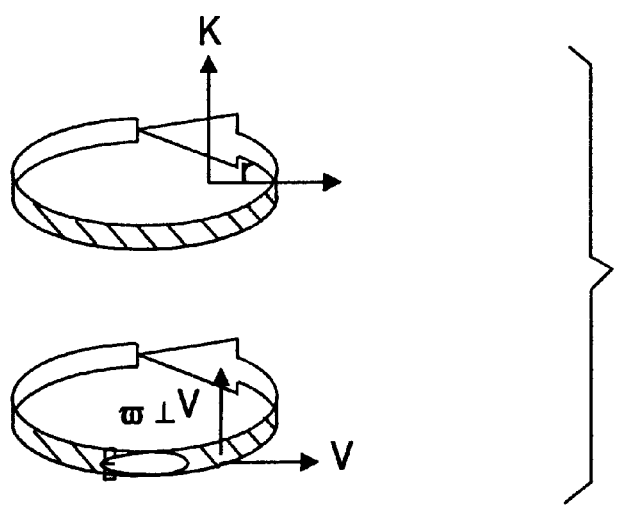
Figure 1C:
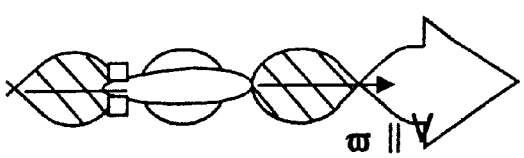

A "helical trajectory" is defined as a trajectory such as those presented in FIG. 1. Circular motion and straight-line motion are considered to be helices with pitch angles of 90° and 0°, respectively (see FIGS. 1b and 1c). Such a trajectory is created by a device that moves with a constant translational velocity (I and constant rotational velocity (ω), as described earlier. If either or both V or ω change, including intermittently going to zero, then the trajectory changes such that it is no longer a helix, in the strict sense, but is still a trajectory that is piecewise helical. The term "helical trajectory" is intended to include such piecewise helical trajectories.

A "Helically Travelling Device" (HTD) is defined as any device that moves along a helical trajectory. A "device" is any machine or other object that is free to translate and rotate in 3D space. As examples, the term includes devices that are self-propelled and/or capable of producing thrust or generating motion, such as rockets, submarines, torpedoes, aircraft, motile swimming living cells, lighter-than-air craft, etc., and also includes devices that are ballistic or inertial such as bullets, mortars, missiles, and hand-thrown objects.

Figure 2A:
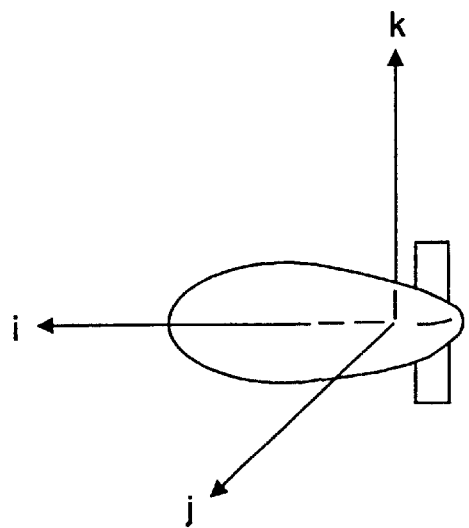
FIG. 2a shows the reference frame ijk fixed to the body of the object.
Figure 2B:
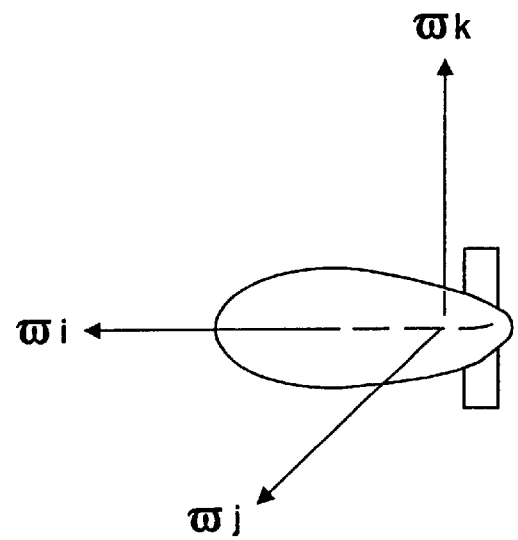
FIG. 2b shows the three non-zero components of $\omega$.
Figure 2C:
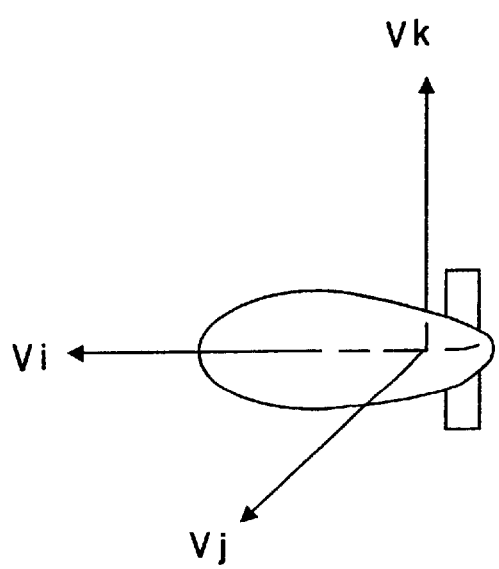
FIG. 2c shows the three non-zero components of V.
Figure 3A:
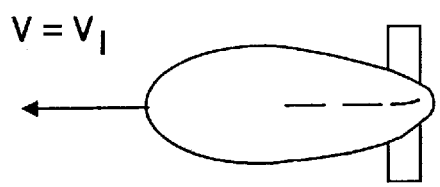
FIG. 3a shows V with only one non-zero component ($V = V_i$).

The motion of an HTD (or any device in 3D) is completely described by the device's rotational velocity ω and translational velocity V. These vectors can be described with respect to the device's reference frame—the fore/aft axis, the left/right axis, and the dorsal/ventral axis, hereon referred to as i, j, and k, respectively (see FIG. 2a). Thus, ω and V each have three components, ($ω_i$, $ω_j$, $ω_k$) and ($V_i$, $V_j$, $V_k$) (see FIGS. 2b and 2c). To simplify the following discussion, V is considered to have only one non-zero component $V_i$ ($V_j$=$V_k$=0, so the device moves with its fore-end forward), and ω is considered to have only two non-zero components $ω_i$ and $ω_j$ ($ω_k$=0). Under these constraints, the following points are noted:

$ω_i$ can be considered the component of ω that is parallel to V ($ω_∥$—see FIG. 3). This is equivalent to "roll".

$ω_j$ is the component of ω that is perpendicular to V ($ω_⊥$—see FIG. 3). This is similar to "yaw" or to "pitch".

The pitch angle (θ) of the helical trajectory is given by the angle between $ω_∥$ and ω (see FIG. 3).

Of course, the following explanation still extends to devices with all non-zero components of V and ω.

A "signal field" is defined as any parameter that can be represented as a vector field (as opposed to a scalar field); examples of vector fields include a beam of light, a magnetic field, an electric field, a chemical concentration gradient, a temperature gradient, and a sound pressure level gradient surrounding an acoustic source. Notably, the gradient of a scalar field is a vector field.

An "attitude restrained device" (ARD) is defined as a device that moves in 3D space applying Restraint 2 (described in "Summary of the Invention").

An HTD and an ARD differ, therefore, in three prominent ways:
(1) An ARD applies Restraint 2, whereas an HTD does not apply Restraint 2.
(2) The steady-state for an ARD is straight-line motion in which the attitude of the device is constant (no rotation of the device), whereas the steady-state for an HTD is a helical trajectory in which the device is continuously rotating.
(3) A ARD steers by pointing V, while an HRD steers by pointing ω.

A.2. An HTD Steers by Varying the Direction of ω

Figure 4A:
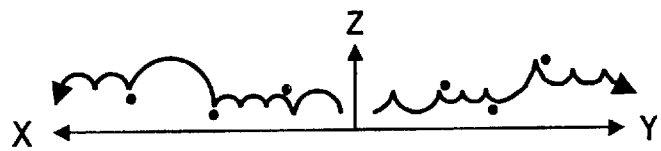
FIG. 4a shows that changing the magnitude of $\omega$ but not the direction of $\omega$ does not change the direction of K. $\omega$ changes at three points (marked by dots), but K does not change direction from straight section to straight section.
Figure 4B:
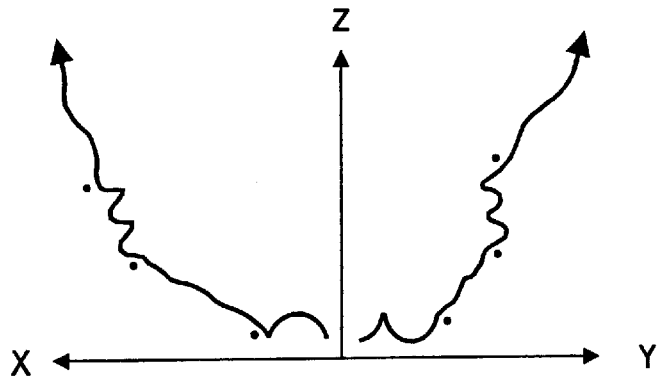
FIG. 4b shows that as $\omega$ changes direction at three points (marked by dots), K changes direction each time.
Figure 4C:
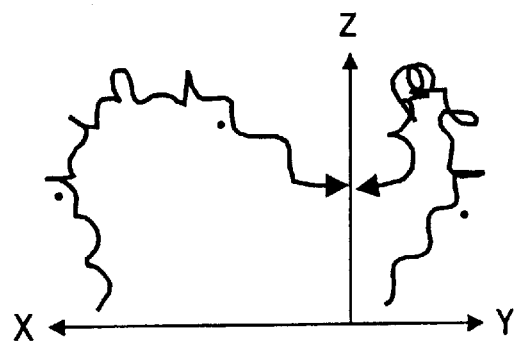
FIG. 4c shows that as $\omega$ changes continuously (between the point marked by a dot and the point marked by a circle), the direction of $\omega$ changes, so K changes also. Note that the trajectory no longer appears helical because of the continuous changes in $\omega$.

The axis of a helical trajectory (K) is the net direction of motion for an HTD. To a first approximation, ω is parallel to K, so an HTD must steer by pointing ω in the correct direction in 3D space (note that this is unlike an ARD for which steering is accomplished by pointing V in the correct direction). Changing the direction of ω in 3D space is accomplished simply by changing the direction of ω with respect to the body axes of the HTD. For example, an HTD will have a new net direction of motion if it begins to rotate more rapidly around its fore/aft axis (i.e. $ω_∥$ increases so θ decreases) (see FIG. 4a). Changes in the direction of K arise as a result of both discrete changes in ω (see FIG. 4a) and continuous changes in ω (see FIG. 4b).

A.3. Sensor Output for an HTD for Scalar and Vector Fields

Figure 5A:
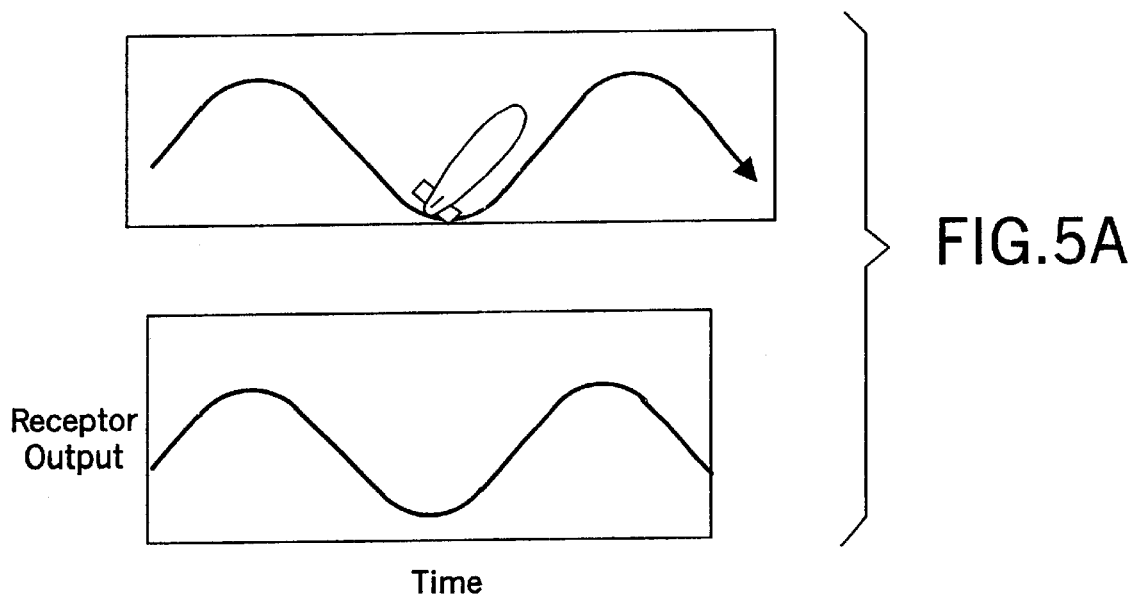
FIG. 5a is a schematic illustration of an HTD having a nondirectional chemosensor in an environment in which the signal is a chemical concentration gradient. As the HTD moves up and down the gradient, the output from the sensor oscillates.

If an HTD possesses a sensor for a signal, the output from that sensor will be modulated by the helical motion of the HTD, providing directional information about the signal. If the signal is a scalar gradient and the sensor is non-directional (i.e. the sensor measures only the local intensity of the signal, not its direction) then the output of the sensor will oscillate sinusoidally as the HTD moves through 3D space along a helical trajectory with non-zero radius. An example is an HTD with a chemo-sensor that moves through a chemical concentration gradient in space (FIG. 5a).

Figure 5B:
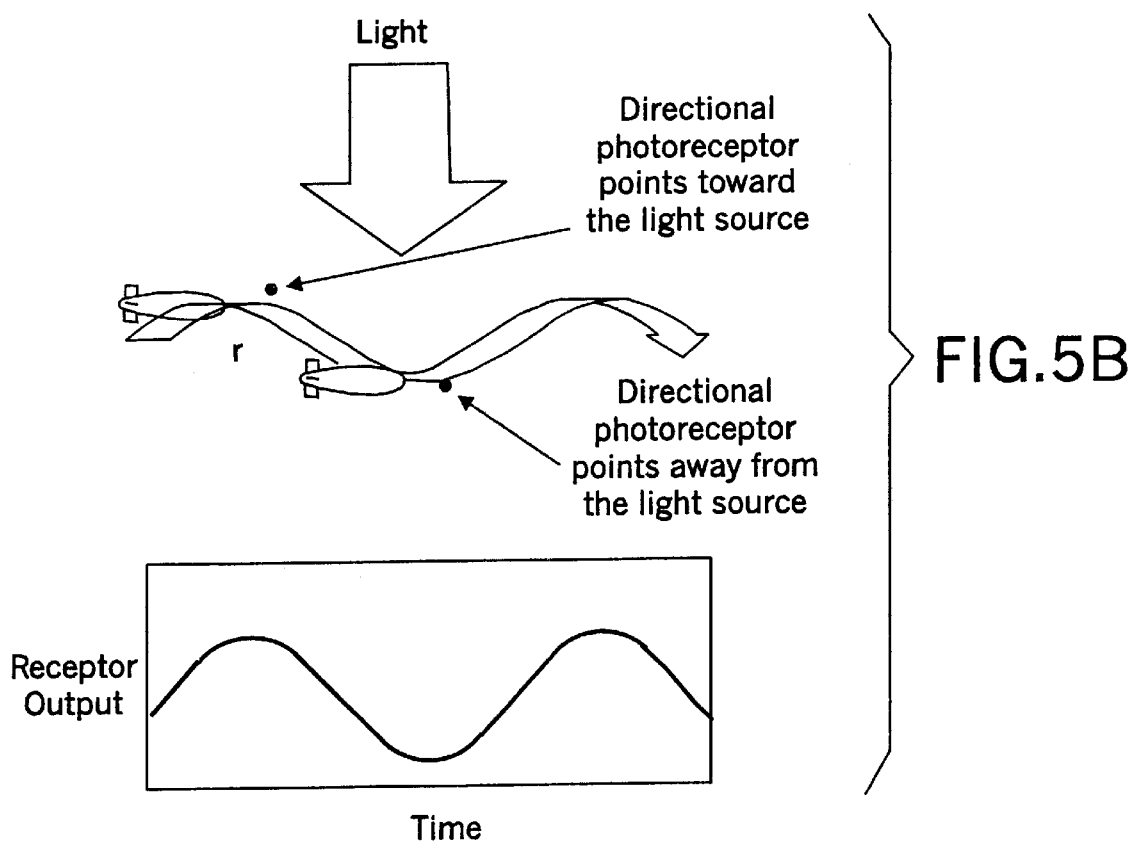
FIG. 5b is a schematic illustration of an HTD having a directional photoreceptor that produces its largest output when pointing toward the source of a light, wherein the HTD is in an environment in which the signal is a beam of light. The direction of maximum sensitivity of the photoreceptor does not point in the direction of $\omega$, so, as the HTD rotates, the sensor points toward the source of the light and then away from the source of the light, causing the output from the receptor to oscillate.

If the signal is a vector field and the sensor is directional (i.e. the sensor is sensitive to both the local intensity and the direction of the signal), then the output of the sensor will oscillate as the HTD rotates in space. Notably, this oscillation will occur for both a zero radius, as in FIG. 1c, and a non-zero radius, as in FIG. 1a. An example is an HTD with a photosensor that moves through a light beam (FIG. 5b).

Thus, in both cases, the output from the sensor oscillates when the axis of the helix (K), and thus ω, is not aligned with the signal field. The output from the sensor acts as an error signal, with the amplitude of oscillation dropping to zero as ω becomes more nearly aligned with the signal field.

A.4. Modulation of ω Based on Sensor Output Aligns ω to the Signal

If an HTD modulates the body-axis components of ω as a function of the output of a sensor (described in Point 3), then ω will automatically align with the signal. Importantly, ω changes direction with respect to V as a function of the output of the sensor. Alignment can be either parallel or anti-parallel with the local direction of the signal. This orientation occurs automatically—if ω changes direction relative to V as a function of sensor output, then the only stable result is orientation. Orientation can occur in one of three similar ways:

A.4.a. Alignment of ω to Bring it More Nearly Parallel to the Signal

Orientation can occur if the instantaneous change in ω, as a function of sensor output, aligns ω more nearly parallel with the signal. The function can include both continuous changes (i.e. ω is a continuous function of signal output) and discrete changes (i.e. changes in ω are abrupt, such as a discontinuous change in one component of ω in response to a threshold). For example, an HTD with a non-directional chemosensor that swims in a chemical concentration gradient will automatically align ω, and thus its net direction of motion, up the gradient (toward the source of the chemical) if it rotates more rapidly about its fore-aft axis (increases $ω_∥$) as the chemical concentration increases (FIG. 6). It is instructive to examine this example. Initially, the axis of the helix is perpendicular to the chemical concentration gradient (∇C) and the HTD does not respond to the gradient (FIG. 6a). As the HTD passes the X-maximum of the trajectory it begins to move down the gradient because V is pointed down the gradient (FIG. 6b), and the HTD begins to respond to the gradient. As the HTD moves down the gradient, chemical concentration decreases, and $ω_∥$ decreases in response. This decrease in $ω_∥$ causes the pitch angle (θ) to increase while V is pointed down the gradient, so the axis of the helix (K) rotates more nearly parallel to the gradient. As the HTD turns around the helix, V rotates to point up the gradient and now the HTD moves up the gradient (FIG. 6c). The HTD now encounters increasing chemical concentration and responds by increasing $ω_∥$. This causes θ to decrease, and ω rotates more nearly parallel to V. Because V is now pointed Lip the gradient, ω again rotates more nearly parallel to ∇C. Repeated turns around the helix causes ω to better align with ∇C (FIG. 6c).

Figure 7A:
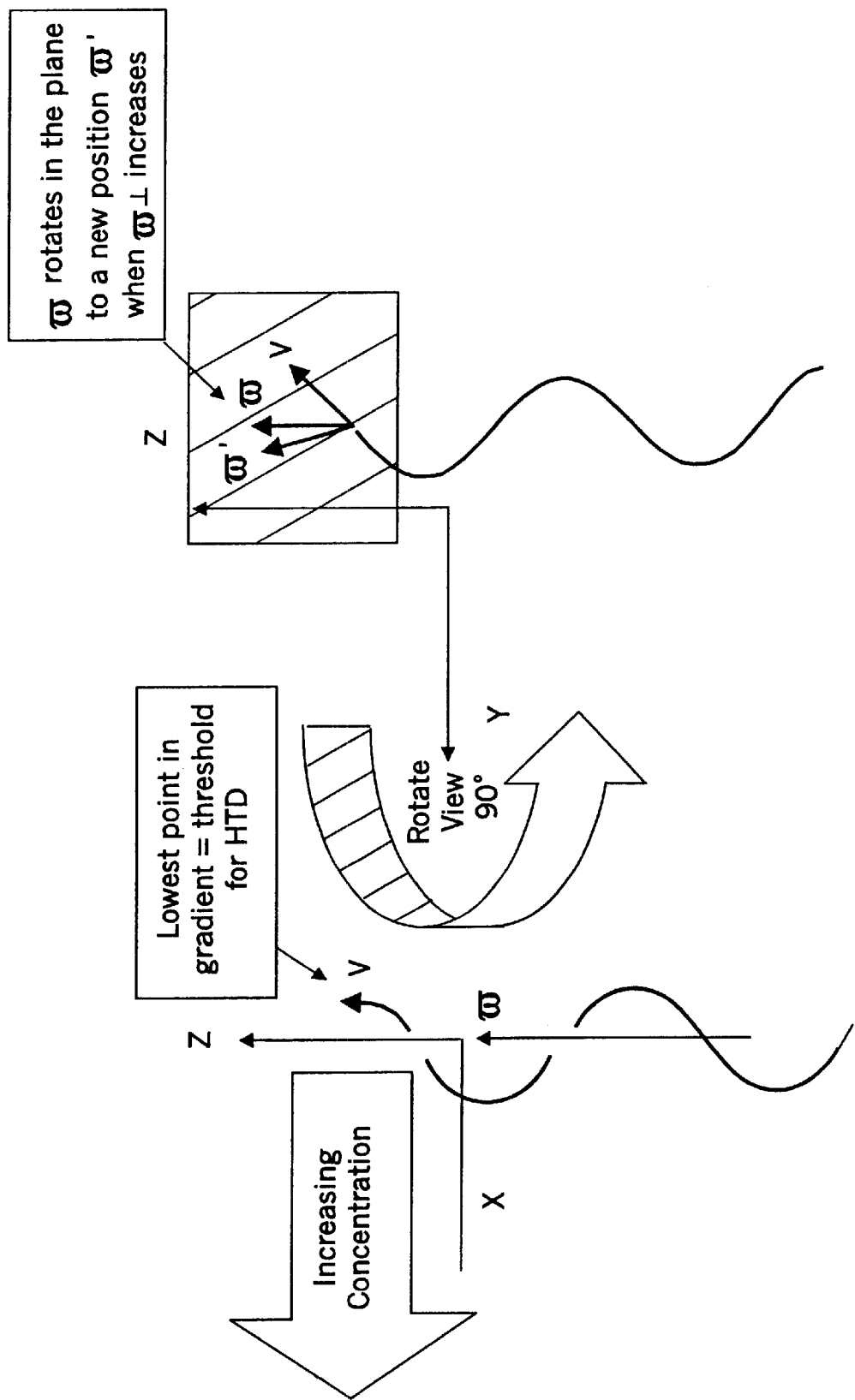
As shown in FIG. 7a, a device moves with the axis of its helical trajectory K initially perpendicular to $\nabla C$. As the device moves, the chemical concentration it encounters oscillates. The point on the helical trajectory that is furthest down the gradient is a threshold point. On reaching this point, V, $\omega$, and $\omega_\perp$ are aligned perpendicular to $\nabla C$ (FIG. 7a). On reaching this threshold, $\omega_\perp$ increases, causing $\omega$ to rotate perpendicular to V and to $\nabla C$ (FIG. 7a). This increase in $\omega_\perp$ causes V to rotate more nearly parallel to $\nabla C$, but a has not aligned more nearly parallel to $\nabla C$ (FIG. 7a and 7b). $\omega_\perp$ then returns to its original value, causing $\omega$ to align more nearly parallel to $\nabla C$ because V has been aligned more nearly parallel to $\nabla C$ (FIG. 7c). Thus, although the initial response does not align $\omega$ more nearly parallel to the signal field, the integral of the change in $\omega$ over the entire response does align $\omega$ more nearly parallel.
Figure 7C:
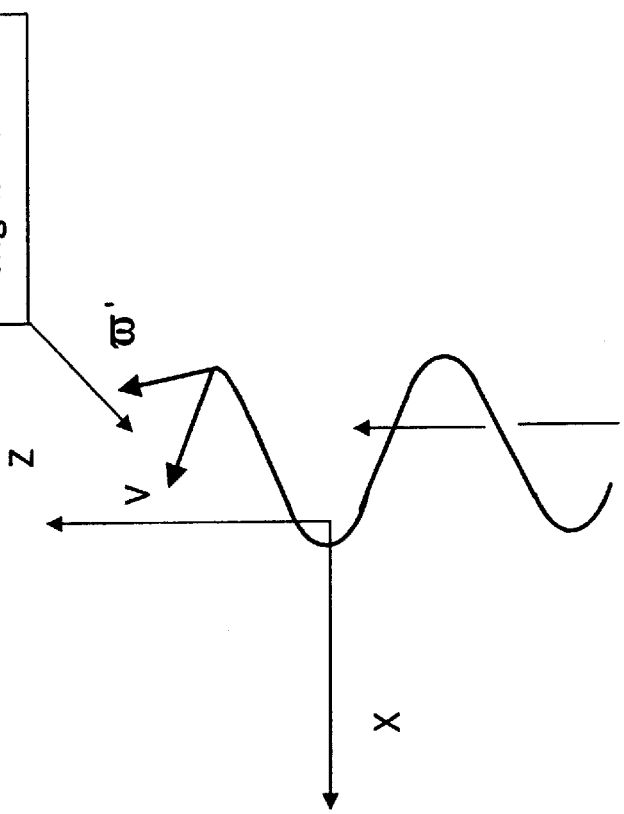
FIG. 7 is a series of schematic diagrams that illustrate the orientation of a device to a chemical concentration gradient $\nabla C$. Chemical concentration C increases in the positive X direction. In this example, $\omega_\perp$ increases when C drops below a threshold then, after a brief time, returns to its original value.
Figure 7B:
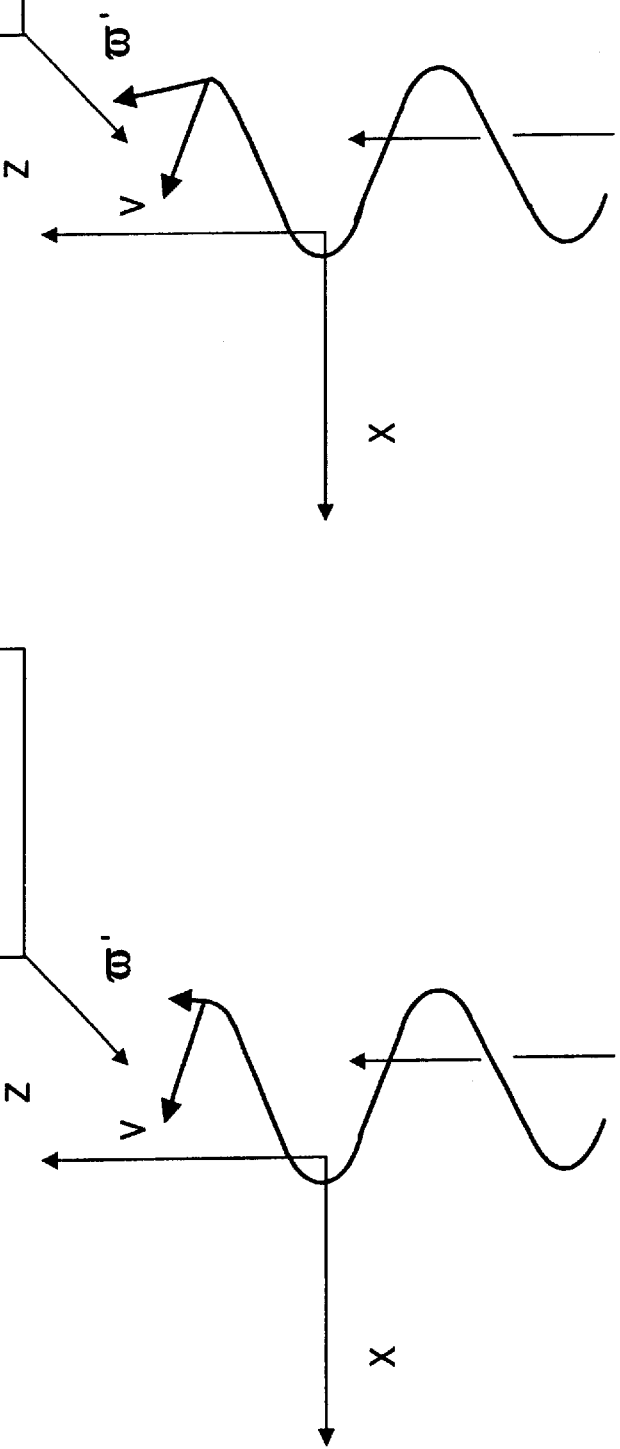

A.4.b. Alignment of ω Such That the Response Does Not Initially Align ω More Nearly Parallel to the Signal—Changes in $ω_⊥$ Orientation can occur if the instantaneous change in ω, as a function of sensor output, aligns ω more nearly perpendicular to the signal field (i.e. not parallel to the signal field as in Section A.4.a above), as long as the change in ω, integrated over one turn of the helix, aligns ω parallel to the signal field. Consider the following: in the example above, let the point on the helical trajectory that is furthest down the gradient be a threshold point. At reaching this point, V, ω, and $ω_⊥$ are aligned perpendicular to ∇C (FIG. 7a). On reaching this threshold, $ω_⊥$ increases, causing ω to rotate perpendicular to V and to ∇C. This increase in $ω_⊥$ causes V to rotate more nearly parallel to ∇C, but ω has not aligned more nearly parallel to $\nabla C$. $\omega_\perp$ then returns to its original value. If the return of $\omega_\perp$ to its original value occurs while V is at some angle to $\nabla C$ that is less than before the response (FIG. 7b), then $\omega$ aligns more nearly parallel to $\nabla C$ because V has been aligned more nearly parallel to $\nabla C$ (FIG. 7c). Thus, although the initial response does not align $\omega$ more nearly parallel to the signal field, the integral of the change in $\omega$ over the entire response does align $\omega$ more nearly parallel to the signal field.

A.4.c. Alignment of $\omega$ Such That the Response Does Not Initially Align $\omega$ More Nearly Parallel to the Signal—$\omega_\parallel$ Decreases to Zero This is similar to the mechanism described in Section A.4.b. Orientation can occur if the instantaneous change in $\omega$, as a function of sensor output, is perpendicular to the signal, and $\omega_\parallel$ drops to zero transiently causing the trajectory to become effectively 2D (i.e. a circle or a 2D spiral). This causes the body of the HTD, and thus V, to rotate in in a plane. As in Section A.4.b above, V will align more nearly parallel (or antiparallel) to the signal field. The HTD can then use a second rule (i.e. $\omega$ is now some other function of sensor output) to determine when V has aligned most nearly parallel to the signal and, at that point, return $\omega_\parallel$ to its original value. The result is that $\omega$ aligns more nearly parallel to the signal.

Note that these examples use a chemical concentration gradient as the signal field, but alignment can be accomplished by similar means to any signal field. Similarly, mathematical manipulation of a signal field can produce new signal fields. For example, depth in the ocean is a scalar field, so its gradient ($\nabla D$) represents a signal field. An HTD can be made to orient perpendicular to $\nabla D$ and at a preselected point in that gradient (D=d) by defining a new signal field:

$$\text{New signal field} = \frac{1}{\left(\frac{d'-d}{\Delta d}\right)^2 + 1}$$

where d' is the depth measured, d is target depth, and $\nabla d$ is a preset range about d ($\nabla d = d^+ - d^-$, where $d^+$ is the upper limit and $d^-$ is the lower limit). In response to this signal field, the HTD will travel up the gradient and then oscillate about the depth d. (This oscillation is actually $\omega$ pointing up and then down the gradient as the device moves back and forth past d.) The outcome is that the HTD travels perpendicular to ($\nabla D$), on average, upon reaching the target depth.

A.5. Reversing Orientation Direction with a Time or Phase Lag Between Sensor Output and Change in $\omega$ The direction of orientation (parallel or antiparallel) to the signal can be changed by adding a time lag or a phase lag between the sensor output and the change in $\omega$. Basically, if the change in $\omega$ occurs ½ of one turn of a helix after the sensor output, then the direction of orientation reverses.

Figure 9A:
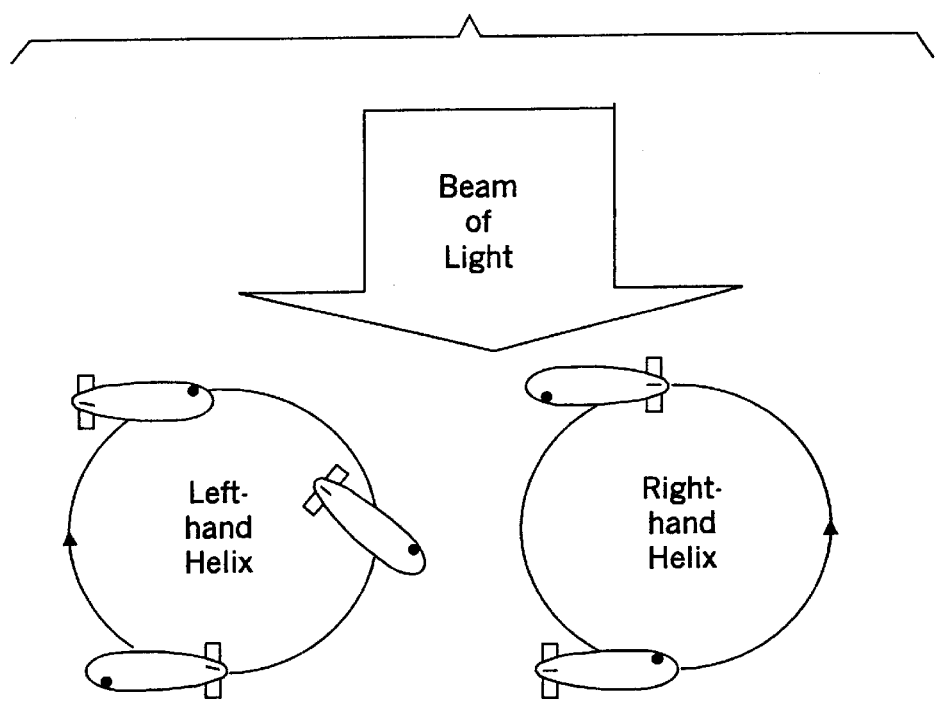
FIG. 9a is a schematic diagram that illustrates a helical trajectory end-on pointing at the viewer; the axis K is in the center of the circle.
Figure 9B:
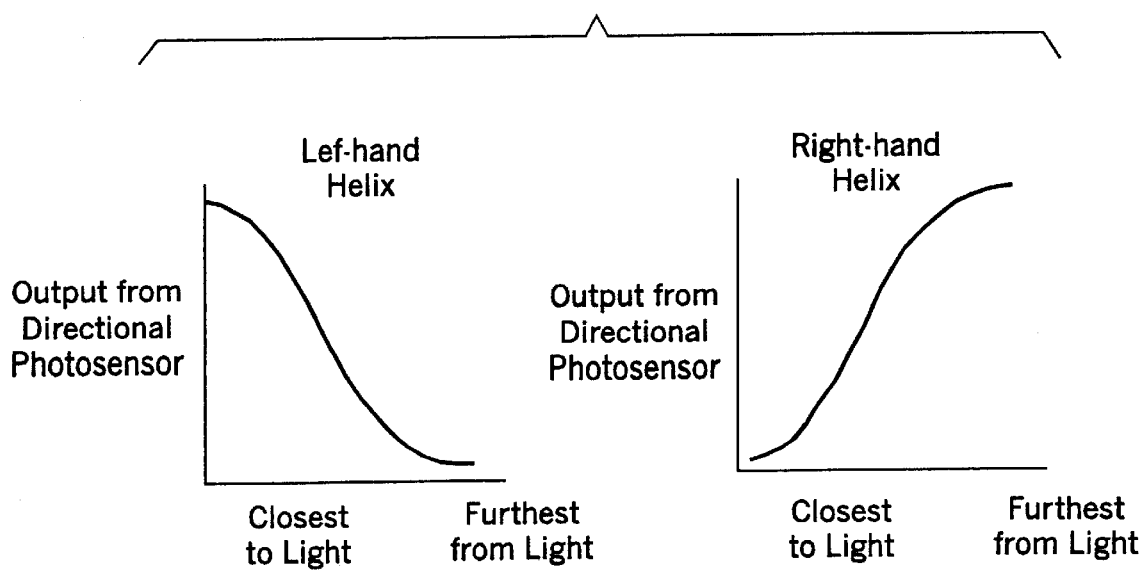
As shown in FIG. 9b, the change in the orientation of the directional sensor alters the phase of the sensor output—for a left-hand helix, the sensor output is largest when the device is closest to the light source, but for a right-hand helix, the sensor output is largest when the device is furthest from the light source. This change in the phase of the sensor output will cause a device that orients toward the light source when moving along a left-hand helix to orient away from the light source when moving along a right-hand helix.

A.6. Reversing Orientation Direction with a Change in Orientation of the Directional Sensor For an HTD with a directional sensor, the direction of orientation (parallel or antiparallel) to the signal can be reversed by changing the orientation of the directional sensor with respect to the axis of the helical trajectory K. Thus, if the sensor switches from pointing toward K to pointing away from K, then the direction of orientation will reverse (i.e. switching from parallel to the signal to antiparallel to the signal, or vice versa) (FIG. 9).

A.7. Orientation to Multiple Signals

Orientation of an HTD can be achieved using multiple signals that are combined to create a new signal. For example, magnetic North M can be used as a signal field to align an HTD North or South. Depth in water, indicated by hydrostatic pressure, is a scalar quantity, but the depth gradient $\nabla D$ is a vector, and thus a signal field. A new signal field can be created by taking the cross-product $M \times \nabla D$, which points West. By extension, any compass setting can be a signal by adding the original magnetic North: $CM + M \times \nabla D$, where C is a constant (FIG. 10). In fact, any direction of orientation in three-dimensional space (with respect to both compass heading and gravity) can be obtained by adding $\nabla D$: $C_1 \nabla D + C_2 M + C_3 (M \times \nabla D)$, where $C_1$, $C_2$, and $C_3$ are constants.

A.8. Summary of HTD Theory

By using these concepts, an HTD can orient to an external signal with a much simpler control mechanism (fewer sensors and actuators, simpler circuitry—fewer and simpler moving parts, overall) than an ARD. No attitude control is required, as in prior art devices. Finally, because orientation can be achieved by changing only one component of $\omega$, the control mechanism can be very simple. For example, the control system can consist of only one sensor, one actuator, and a simple control circuit that makes actuator output a simple function of sensor output. This not only simplifies construction, but may also enable devices to be used in extreme conditions (heat, cold, depth, toxic, high-radiation) inaccessible to other devices, and may enable devices to be constructed in very small sizes to improve accessibility to certain environments, Such as the bodily fluids of living organisms. The smallest size is limited only by the rotational diffusion of the device, which would randomize the direction of motion. For a device in water, the lower size limit is a diameter of approximately 5 $\mu$m. There is no known upper size limit for an HTD.

B. Exemplary Helically Traveling Devices

This section describes examples of devices that travel in a helical trajectory and, therefore, are all controllable through the use of the present invention. In each example, there is a discussion of which features contribute to the elements of the helical trajectory; by controlling those features one can modulate that trajectory.

Figure 11:
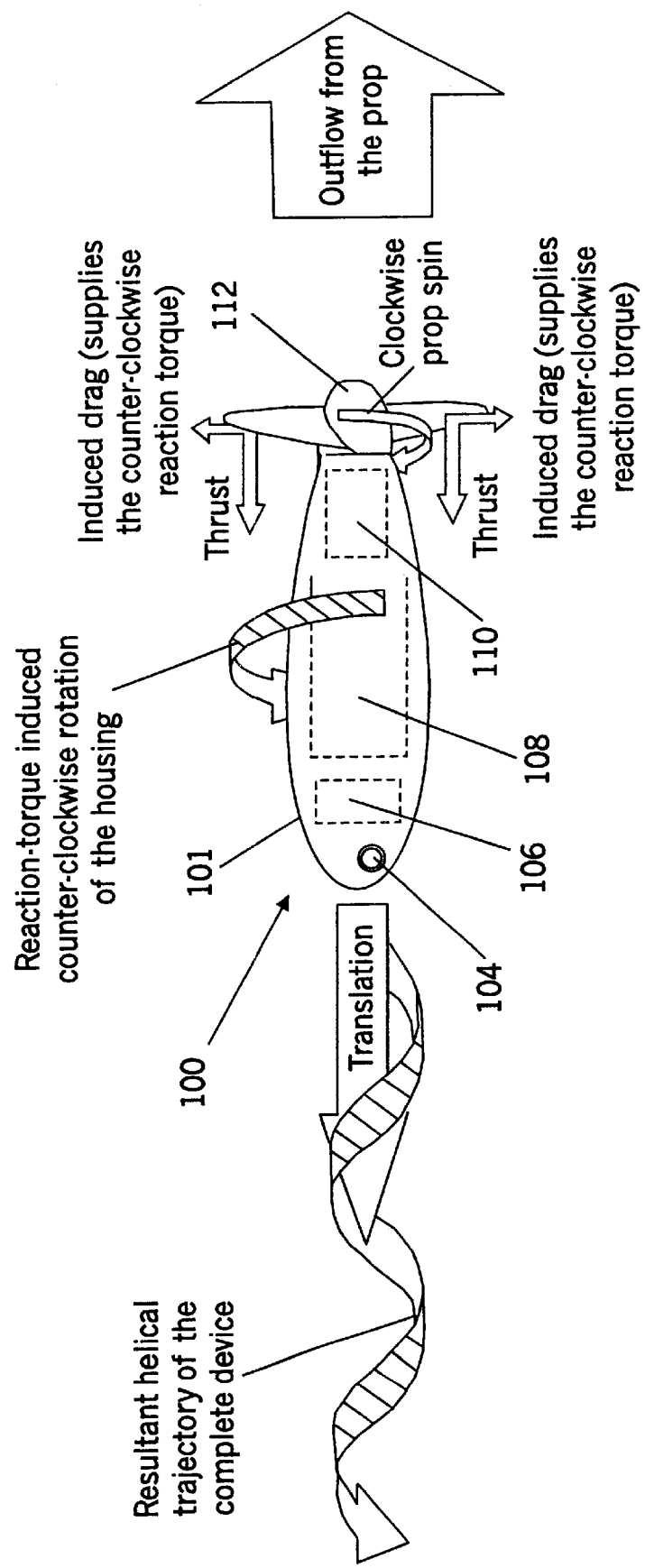
FIG. 11 is a perspective view of a self-guided device of the present invention.

FIG. 11 illustrates a helically traveling device designated broadly at 100. The device 100 includes a housing 101, a photosensor 104 that is operably connected to the controller 106, a battery 108, a motor 110, and a propeller 112. The controller 106, which is typically a conventional microprocessor programmed with an algorithm as described in Section C, is operably connected to a battery 108 that is mounted within the housing 101. Those skilled in the art will appreciate that analog circuitry may also be employed with the present invention. The motor 110 is attached at the rear end of the housing 101 along the longitudinal axis and is electrically connected to the battery 108. The propeller 112 is rotatably mounted to the motor 110 such that the propeller 112 can provide thrust along the longitudinal axis of the housing 101. Of course, power sources other than batteries, such as fuel cells, springs, or compressed air may also be employed with the present invention, as may other thrust units, such as oscillatory impellers, rockets, or jets.

In operation, the device 100, driven by the propeller 112 powered by the motor 110 and battery 108, is propelled forward through a fluid. Because the device 100 is a free body, there is no restraint on the housing 101 to prevent it from rotating about any of its axes, particularly the longitudinal axis. Since propellers are not 100% efficient, some energy is lost (as induced drag) which shows up as a reaction torque acting opposite to the sense of the propeller's 112 rotation. The reaction torque generated by the propeller 112 turning clockwise, for example, causes the housing 101 to rotate counter-clockwise about its longitudinal axis. Thus, in the case illustrated in FIG. 11 the device 100 travels forward along a helical trajectory where the radius of the helix is zero or nearly so (in this instance, the helical trajectory may have a small, nonzero radius that exists mainly due to the effects of imperfections in the housing 101 and propeller 112 and the fluid forces created thereby). As the device 100 travels along its helical trajectory, the photosensor 104 detects the intensity of light present and generates a signal based on that intensity. This signal is passed to the controller 106. The controller 106 processes this signal based on an algorithm such as those described in Section C. After processing, the controller 106 signals the battery 108 to drive the motor 110 and, in turn, the propeller 112, based on the intensity of light detected. Changing the rotation speed of the propeller 112 changes the balance of moments acting on the system, and ω will change direction, so the direction of the axis of the helix will change, correcting the trajectory of the device 100 with respect to the signal field. The rotational velocity ω will change at a rate proportional to the degree that the system is asymmetrical, so the device 100 will change course faster if the magnitude of the default design asymmetry is increased.

Figure 3B:
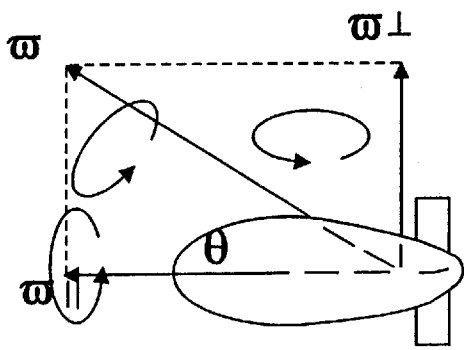
FIG. 3b shows $\omega$ with two non-zero components, one parallel to V ($\omega_\parallel$) and one perpendicular to V ($\omega_\perp$).

As shown in FIG. 3b, a set of axes illustrating the components of the rotational velocity vector ω as they relate to V can be applied to the housing 101 such that $\omega_{\parallel}$ generally extends along the longitudinal axis of the housing 101 and $\omega_{\perp}$ generally extends normal to the longitudinal axis of the housing 101. Although for many devices the illustrated fusiform shape is preferred for its aerodynamic and hydrodynamic properties, the shape of the housing 101 and any attachments may vary depending on the desired function of the device; in fact, any shape that can undergo translation and rotation such that it is capable of traveling along a helical trajectory may be employed with the present invention, including irregular forms.

In FIG. 11, the directional photosensor 104 is mounted at the front end of the housing 101. Notably, the photosensor 104 detects light (from the light signal field) and is mounted so that the direction of the photosensor's maximum sensitivity Σ is not aligned with ω. As a result, as the device 100 travels along a helical trajectory in a light signal field, the photosensor detects a signal whose oscillation amplitude β grows with the misalignment of the axis of the helix with the field. Thus, β decreases to zero upon the axis's perfect alignment with the field. In particular, as the photosensor 104 rotates with the housing 101, the photosensor 104 scans through 360°, i.e., it scans the signal field. Those skilled in the art will appreciate that, although the photosensor 104 is illustrated therein, any directional sensor that is capable of detecting a signal field and generating a signal based on data from the signal field may be employed with the present invention. For example, the sensor may detect a magnetic field, an acoustical field, the proximity to a target in a video frame, or the like.

Alternatively, the detector may be nondirectional, such as a pressure gauge. In that case, the detector can be mounted either anywhere on the housing 101 if the helical trajectory has a nonzero radius, or anywhere except on ω if the radius of the helical trajectory equals zero. As a result, as the device 100 travels along a helical trajectory in a scalar field such as pressure (i.e., depth), the nondirectional detector is carried up and down the gradient. Since the gradient of a scalar field is a vector field, the nondirectional sensor thus now provides directional information as a K alignment error signal whose β grows with the misalignment of K with the field; β decreases to zero upon the K's perfect alignment with the field. Those skilled in the art will appreciate that other nondirectional sensors may be employed with the present invention. For example, the sensor may detect temperature, chemical concentration, or the like.

The discussion that follows describes other embodiments of the present invention that travel along a helical trajectory. In each instance, the components of the device that provide thrust and/or torque (i.e., the components that induce translation and/or rotation) of the device are altered from device to device. It will be understood by those skilled in this art that other devices that include combinations of these components may also be suitable for the present invention. Those skilled in the art will also appreciate that since one may wish the device 100 to change course more quickly, one thus desires a larger and more rapid modulation of ω, and so K, so one may intentionally create large default design asymmetries with these components.

Also, in each instance described below and for equivalent devices, the sensor, controller, and power source are not illustrated, with the understanding that the discussion above regarding these components with respect to the embodiment of FIGS. 11 through 19 is equally applicable here (i.e., each of these devices also includes a sensor, a controller, and a power source).

Figure 12:
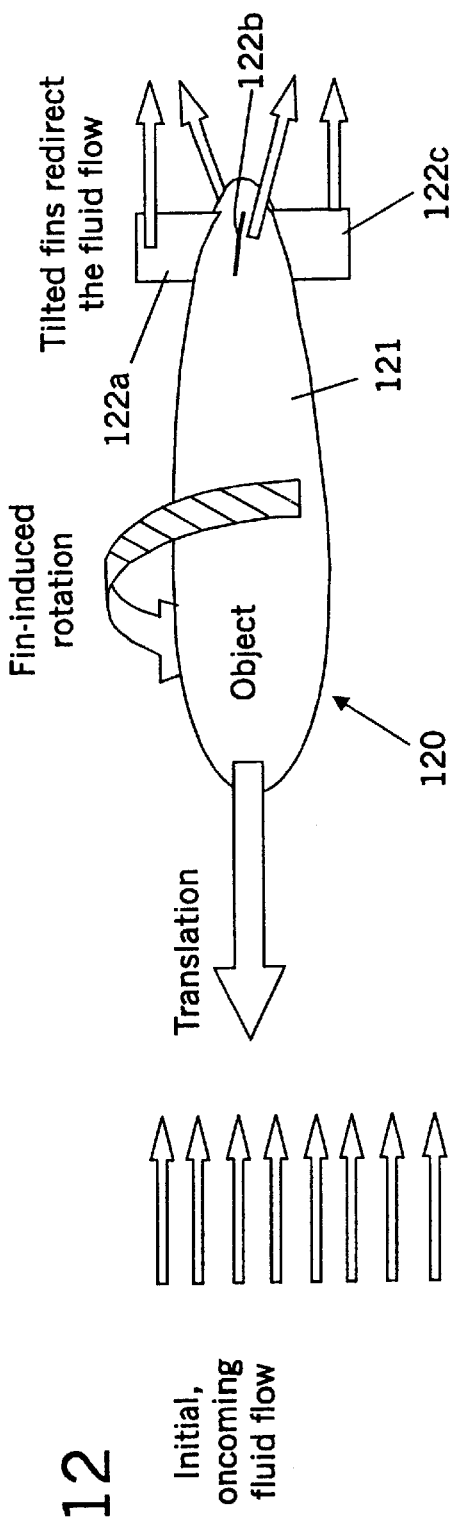
FIG. 12 is a perspective view of a self-guided finned device of the present invention.

FIG. 12 illustrates a finned device 120 which includes a housing 121 upon which are mounted four tilted fins (only three fins 122a, 122b, 122c, are illustrated herein). The fins 122a, 122b, 122c are mounted at an oblique angle (preferably at an angle, α, where 0°<α<25°) to the longitudinal axis of the housing 121 and thus to the oncoming fluid flow. As a result, travel of the device 120 through a fluid causes the fins to develop lift acting normal to their surfaces (thus radially and perpendicular to the longitudinal axis) causing the device 120 to rotate about its longitudinal axis. The magnitude of this rotation may be operably modulated by the controller 106 in response to the output from the sensor 104 to effect orientation.

This device may include its own thrust unit or may be launched from a separate associated thrust unit. The presence of the fins 122a, 122b, 122c can also provide drag if desired for inducing or modulating rotation about the perpendicular (pitch or yaw) axes to effect orientation.

Figure 13:
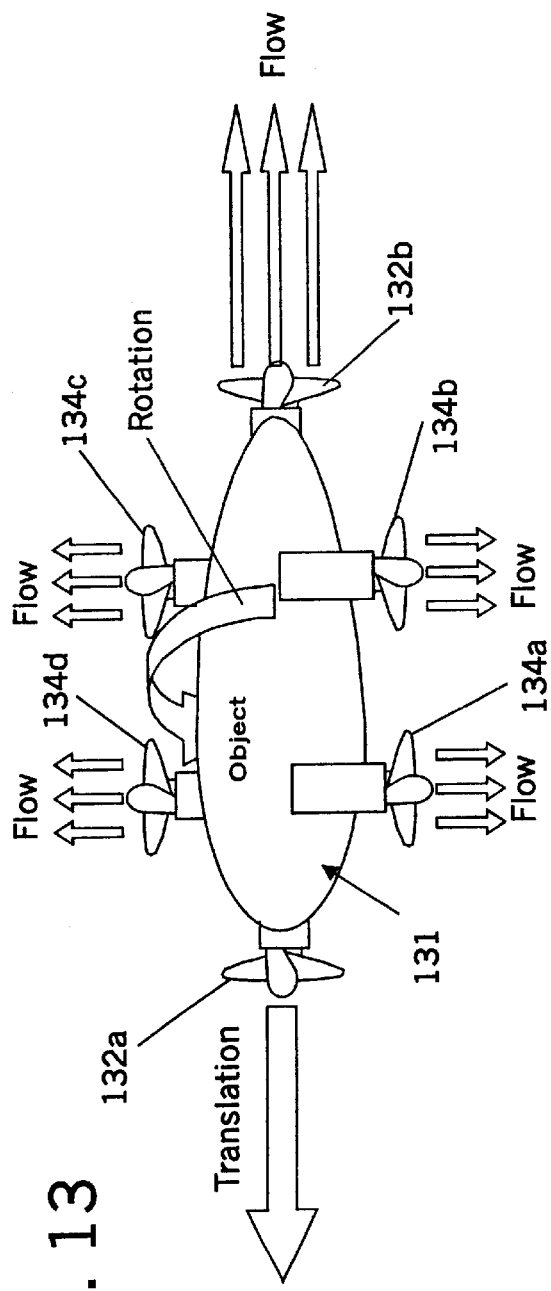
FIG. 13 is a perspective view of a self-guided multi-propeller device of the present invention.

Another embodiment of the present invention is illustrated in FIG. 13, which shows a multi-propeller device 130. The device 130 includes a housing 131 to which are mounted front and rear propellers 132a, 132b that provide axial thrust. Four lateral propellers 134a, 134b, 134c, 134d are eccentrically mounted on the housing 131 via extension arms such that their shafts are parallel but non-coincident. As a result, rotation of all of the lateral propellers 134a, 134b, 134c, 134d causes the device 130 to rotate about its longitudinal axis. The lateral propellers 134a, 134b, 134c, 134d can, in combination, provide forces if desired for inducing rotations about the perpendicular axis. Those skilled in the art will also appreciate that one or more thrusters located about or through the housing 131 oriented at angles oblique to the longitudinal axis may be employed with the present invention.

Figure 14:
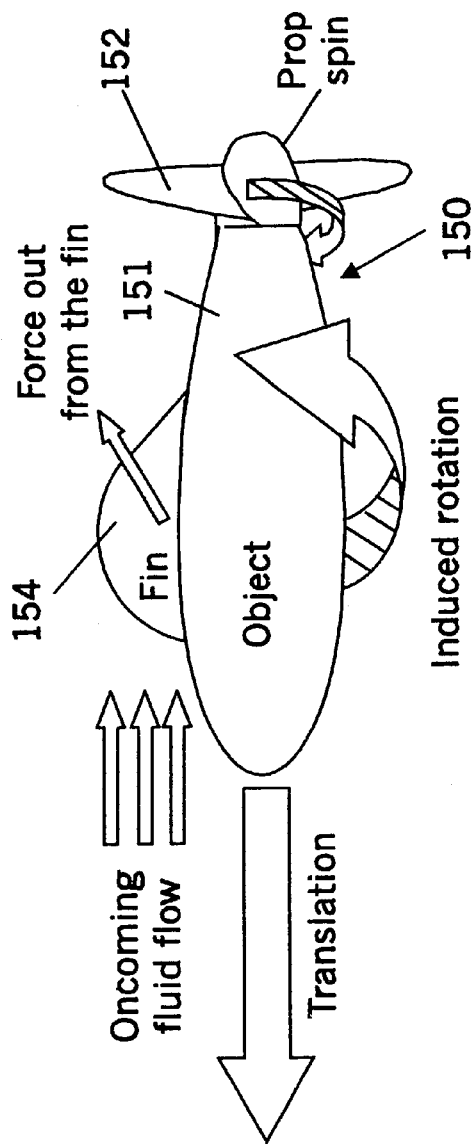
FIG. 14 is a perspective view of a self-guided single propeller-driven finned device of the present invention.

FIG. 14 illustrates a single propeller-driven finned device 150. The device 150 includes a housing 151 and a rear-mounted propeller 152. A fin 154 is mounted onto the housing. The thrust and reaction torque supplied by the propeller 152 drive the fin 154 at an oblique angle with respect to fluid flow. The forces created by the fin 154 as it moves through the fluid induce or modulate rotation (either $\omega_\perp$ or $\omega_\parallel$ or both) in the device 150. In addition, although the fin 154 is illustrated as being fixed to the housing 151, the fin can be extensibly or rotatably mounted to the housing 151 such that the controller (not shown) of the device 150 can rotate, extend, or retract the fin 154 as desired to alter $\omega$ for the device 150. Those skilled in the art will appreciate that other methods for changing the number, shape, curvature, or the orientation of the fin 154 in response to the controller 106 may be employed with the present invention. Those skilled in the art will also appreciate that flaps, vanes, ailerons, trim tabs, or other articulated control surfaces attached to the fin 154 and operated by the controller 106 may be employed with the present invention.

Figure 15:
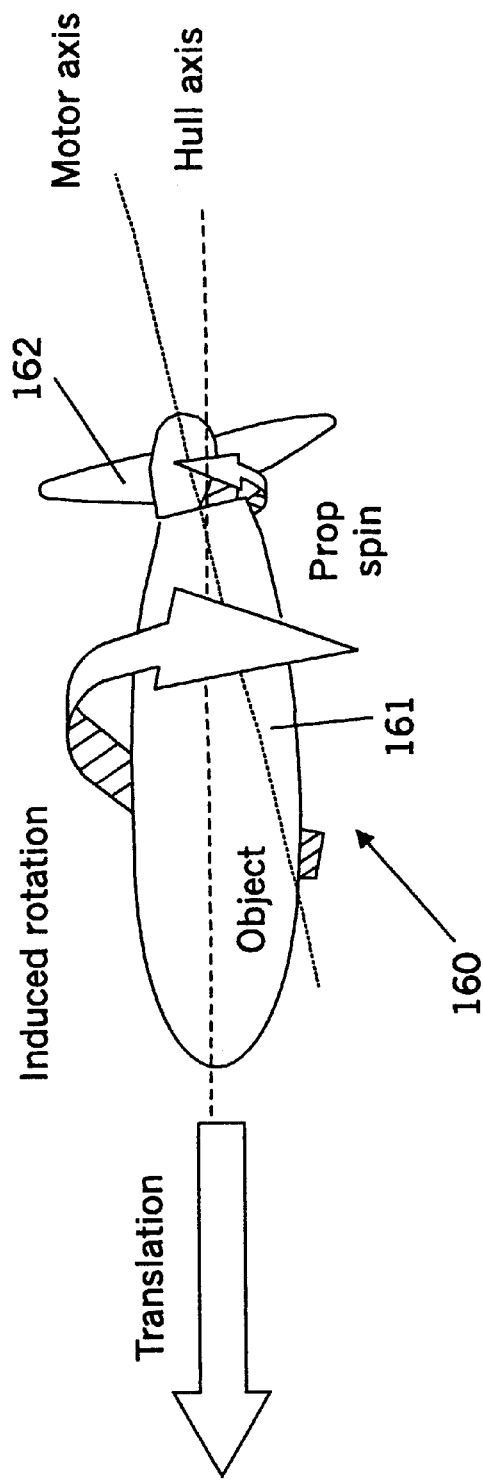
FIG. 15 is a perspective view of a self-guided device of the present invention with an eccentrically mounted propeller.

FIG. 15 illustrates a single eccentrically mounted propeller device 160. The device 160 includes a housing 161 and a rear-mounted propeller 162. Unlike the propellers illustrated in FIGS. 11 through 14, the propeller 162 is mounted such that the axis of rotation of the propeller 162 is not coincident with the longitudinal axis of the housing 161. As a result, operation of the propeller 162 contributes to $\omega_\perp$ as well as to $\omega_\parallel$. Those skilled in the art will appreciate that other methods for misaligning the longitudinal axis and the propeller axis, such as using an asymmetric, bent housing, may be employed with the present invention. Those skilled in the art will also appreciate that one may modulate $\omega$ by modulating the misalignment in response to the controller 106.

Figure 16:
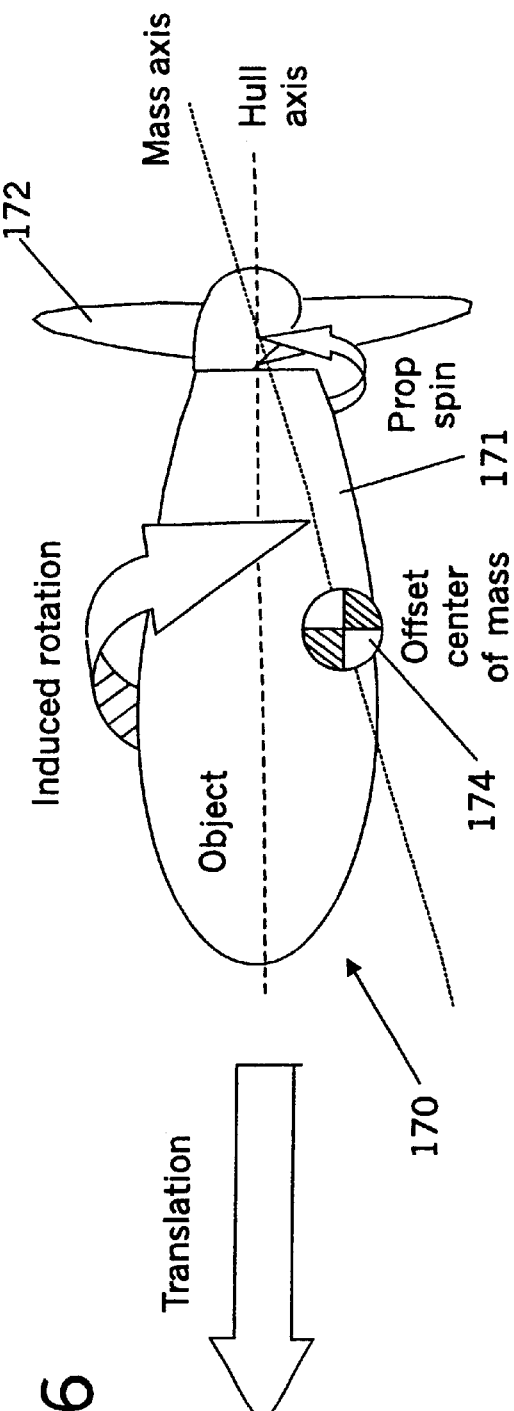
FIG. 16 is a perspective view of a self-guided device of the present invention having an eccentric center of gravity.

FIG. 16 illustrates a single propeller, eccentric mass device 170. The device 170 includes a housing 171 and a rear-mounted propeller 172. The center of mass of the device is offset from the longitudinal axis of the housing 171; this is represented in FIG. 16 schematically as a weight 174 mounted to the wall of the housing 171, although the off-center nature of the center of mass can be achieved in any number of ways including the positioning of a weight on the housing, designing the housing with walls of differing thickness, positioning the power source or other components in an eccentric position. The imbalance in the device 170 resulting from the eccentric center of mass modulates the helical trajectory of the device 170, and the location of the imbalance can itself be operably modulated by the controller 106. Notably, the existence of an eccentric mass 174 alone can produce a change in $\omega$ with an oscillation amplitude, $\beta$, that grows with misalignment of the axis of the helix with gravity; $\beta$ decreases to zero with alignment of the axis of the helical trajectory with gravity. Thus, the moments acting on the device mechanically can act to steer the axis of the helix. In this special case, the device 100 can orient (positively, to go deeper, or negatively, ascend) to gravity without the need for an electronic controller 106 or sensor 104. One may thus construct a device 100 to do this from the start, or the device 100 can recover itself as a backup method when damaged.

Those skilled in this art will appreciate that, although the devices illustrated in FIGS. 11 through 16 each includes its own thrust unit, the concepts of the present invention may also be applied to devices that rely on external thrust provided by a separate thrust unit. For example, a device 180 illustrated in FIG. 17 includes a housing 181 and a sensor 182. The device 180 is loaded into a thrust-supplying unit 184, such as a firearm, that supplies thrust and initial rotation to the device 180. As shown in FIG. 18, the initial thrust and rotation can even be supplied by a human's throwing motion, as the device 180' can be launched with a spiral motion from a hand. In each instance the device should include a unit that can modulate $\omega$ based on the output of the sensor 182.

It should also be recognized that, although a single sensor is illustrated in each of the devices described above, multiple sensors may be included in a single device. For example, a device may include one sensor that controls the helical trajectory of the device (for example, a magnetic sensor) and another that detects a property of the surrounding environment (for example, a temperature or chemical sensor). In another example, a device may include one "directional" sensor and another sensor (for example, a sensor for an acoustic "beacon"), that, once received, influences the response of the device to the directional sensor (it may disable the directional sensor or cause the device to respond differently to the directional sensor). In some embodiments, a device may also include a transmitter of a signal to be received under some circumstances by other devices, or may include a data collection unit to enable the collection of data if desired. Such embodiments are described below in Section D.

It is also contemplated that the devices described above may include a "payload" directed to specific purpose once the device arrives at a desired location. Typical payloads may include explosives for a munitions device, a neutralizing agent for a device designed to locate a chemical spill, or a dye-, radio signal-, or acoustic beacon-emitting device to mark the location of a found object.

C. Embodiments of Algorithms for Use with Helically Traveling Devices

The descriptions of orientation mechanisms presented in Section A.4 are kinematic descriptions—they do not include descriptions of the forces, or the underlying mechanisms that generate these motions. The embodiments presented here illustrate mechanisms by which the requisite forces can be generated. They are not exclusive—other embodiments are possible. All of the following embodiments are similar in that the sensor or detector of an HTD is sensitive to a signal field, generating a signal responsive to the signal field that is then sent to the controller. Variations between embodiments are how the controller manipulates at least one of the rotation-inducing and translation-inducing units on the HTD.

C.1. Embodiments Described in Section A.4.a

As described in Section A.4.a, the controller of an HTD signals the rotation-inducing unit to modulate $\omega$. The rotation-inducing unit can be, but is not necessarily, independent of the device's translation-inducing unit. For the devices described in Section A.4.a, the change in $\omega$ always causes $\omega$ to align more nearly parallel to the signal field.

This will occur for an HTD, Such as the device 190 illustrated in FIG. 19, that has a rotation-inducing unit composed of two parts: $\omega_\parallel$ is generated by the reaction torque of the propeller 192; and $\omega_\perp$ is generated by a turning moment arising from drag on a control flap 194 mounted on the housing 193 of the HTD, whereby elevation of the control flap 194 is altered by the controller. When the flap 194 is lowered, it is nearly flat against the housing 193 of the HTD 190 and thereby induces a smaller drag that generates smaller $\omega_\perp$. When the flap 194 is raised, it stands out from the housing 191 and generates larger drag which increases $\omega_\perp$. For an HTD orienting to a depth gradient, the flap 194 is raised as depth decreases; thus $\omega_\perp$ increases, and $\omega$ aligns more nearly perpendicular to V, which is pointing up the gradient (toward deeper depths), causing $\omega$ to align up the gradient. When the HTD 190 turns around the helical trajectory, it encounters increasing depths, and the flap 194 is lowered—$\omega_\perp$ decreases, and $\omega$ aligns more nearly parallel to V, which is now pointed up the gradient, so $\omega$ again aligns more nearly parallel up the gradient (toward deeper depths).

This also will occur for an HTD for which the rotation-inducing unit is composed of two parts: e.g., $\omega_\parallel$ is generated by a torque about the long axis of the housing arising from four tilted fins as in FIG. 12 whereby the angle of attack of the fins, with respect to the fluid flow, is modulated by the controller; $\omega_\perp$ is generated by any axial asymmetry in the housing, such as a bent housing or a bump on one side. For an HTD orienting to a chemical concentration gradient as in FIG. 6, the angle of attack of the fins is decreased as chemical concentration decreases; thus $\omega_\parallel$ decreases, and $\omega$ aligns more nearly perpendicular to V, which is pointing down the gradient (toward lower concentrations), causing $\omega$ to align with the gradient. When the HTD turns around the helical trajectory, it encounters increasing concentrations, and the angle of attack increases—$\omega_\parallel$ increases, and $\omega$ aligns more nearly parallel to V, which is now pointed up the gradient, so $\omega$ aligns more nearly parallel to the gradient (toward increasing concentration).

C.2. Embodiments Described in Section A.4.b

As described in Section A.4.b, the controller of an HTD signals the rotation-inducing unit to modulate $\omega$. The rotation-inducing unit can be, but is not necessarily, independent of the device's translation-inducing unit. For the 1 0 invention described in Section A.4.b, the change in $\omega$ occurs in two phases: in the first phase $\omega$ aligns more nearly perpendicular to the signal field then V aligns more nearly parallel to the signal field; in the second phase, after V has more nearly aligned with the signal field, $\omega$ aligns more nearly parallel to V which thereby aligns $\omega$ to the signal field.

This will occur for an HTD that has a rotation-inducing unit composed of two parts: e.g., $\omega_\parallel$ is generated by the reaction torque of a propeller, as in FIG. 11; $\omega_\perp$ is generated by a turning moment arising from drag on a control flap mounted on the housing of the HTD (as in FIG. 19) whereby elevation of the control flap is altered by the controller. When the flap is lowered, it is nearly flat against the housing of the HTD and thereby induces a smaller drag that generates smaller $\omega_\perp$. When the flap is raised, it stands out from the housing and generates larger drag which increases $\omega_\perp$. For an HTD orienting to a depth gradient, the two-phase response is initiated when a minimum of depth is detected by the sensor/controller which occurs when the HTD's helical trajectory carries the HTD closest to the surface during one rotation of the helix. In the first phase the control flap is raised and $\omega_\perp$ increases, causing $\omega$ to align more nearly perpendicular to V, which now lies in a plane perpendicular to the gradient (V points in a direction of constant depth). The increase in $\omega_\perp$, however, causes V to align up the gradient (pointing in a direction of increasing depth); in the second phase, the flap is lowered and $\omega_\perp$ decreases, causing $\omega$ to align more nearly parallel to V and thus more nearly up the gradient (toward deeper depths).

C.3. Embodiments Described in Section A.4.c

As described in Section A.4.c, the controller of an HTD signals the rotation-inducing unit to modulate $\omega$. The rotation-inducing unit can be, but is not necessarily, independent of the device's translation-inducing unit. For the invention described in Section A.4.c, the change in $\omega$ occurs in two phases: in the first phase, $\omega_\parallel$ drops to zero, whereby the trajectory becomes two-dimensional, causing $\omega$ to align more nearly perpendicular to the signal field, which causes V to align more nearly parallel to the signal field; in the second phase, after V has more nearly aligned with the signal field, $\omega$ aligns more nearly parallel to V which thereby aligns $\omega$ to the signal field.

This will occur for an HTD that has a rotation-modulation unit composed of two parts: e.g., $\omega_\parallel$ is generated by a torque about the long axis of the housing arising from four tilted fins as in FIG. 12 whereby the angle of attack of the fins, with respect to the fluid flow, is modulated by the controller; $\omega_\perp$ is generated by any axial asymmetry in the housing, such as a bent housing or a bump on one side. For an HTD orienting to a depth gradient, the two-phase response is initiated when a minimum of depth is detected by the sensor/controller which occurs when the HTD's helical trajectory carries the HTD closest to the surface during one rotation of the helix. In the first phase the angle of attack of the fins is changed to make $\omega_\parallel$ drop to zero. $\omega_\perp$ remains approximately constant, so the trajectory becomes circular (2D trajectory) for which $\omega$ is aligned perpendicular to V. At this point on the helical trajectory, V lies in a plane perpendicular to the gradient (V points in a direction of constant depth). The decrease in $\omega_\parallel$, however, causes V to align with the gradient (pointing in a direction of increasing depth) as the HTD travels along its now circular trajectory; in the second phase, the angle of attack of the fins returns to their original value and $\omega_\parallel$ increases, causing $\omega$ to align more nearly parallel to V and thus more nearly parallel to the gradient (toward deeper depths).

D. Exemplary Applications for Helically Traveling Devices

Many HTDs can take advantage of the capabilities discussed above to enhance performance or accomplish tasks previously considered to be impractical. Some examples of such devices are described below.

1. Transect Sampling with Multiple Devices

An HTD can be designed to travel horizontally along a constant compass setting by employing a sensor that detects a magnetic field and another sensor that detects pressure and aligns the device to travel along a chosen heading (see Section A.7). The device can also carry additional sensors for some environmental parameter, such as temperature, salinity, light, chemical concentration, or the like. As the device travels along its chosen heading, it reads all, or a subset of, its sensors and stores the data in internal memory for later retrieval. This device, therefore, produces a record of parameter vs. time, permitting extrapolation to parameter vs. position on transect. It will be appreciated by one skilled in the art that the spatial resolution of the data can be enhanced using such techniques as timed-difference-of-arrival (TDOA), long- and short-baseline interferometry, GPS, precision clocks, and the like.

In operation, multiple devices can be deployed to swim in predefined patterns (e.g., all in parallel, or radiating from a central point of release) to permit rapid sampling of areas. In addition, multiple devices can be made to swim at predefined depths through the inclusion of depth sensors, thereby permitting rapid sampling of volumes. Those skilled in the art will appreciate that one may release devices of more than one type at a time to synchronously collect many data types while keeping unit costs low.

2. Small Precision Guided Munitions (PGM)

Figure 17:
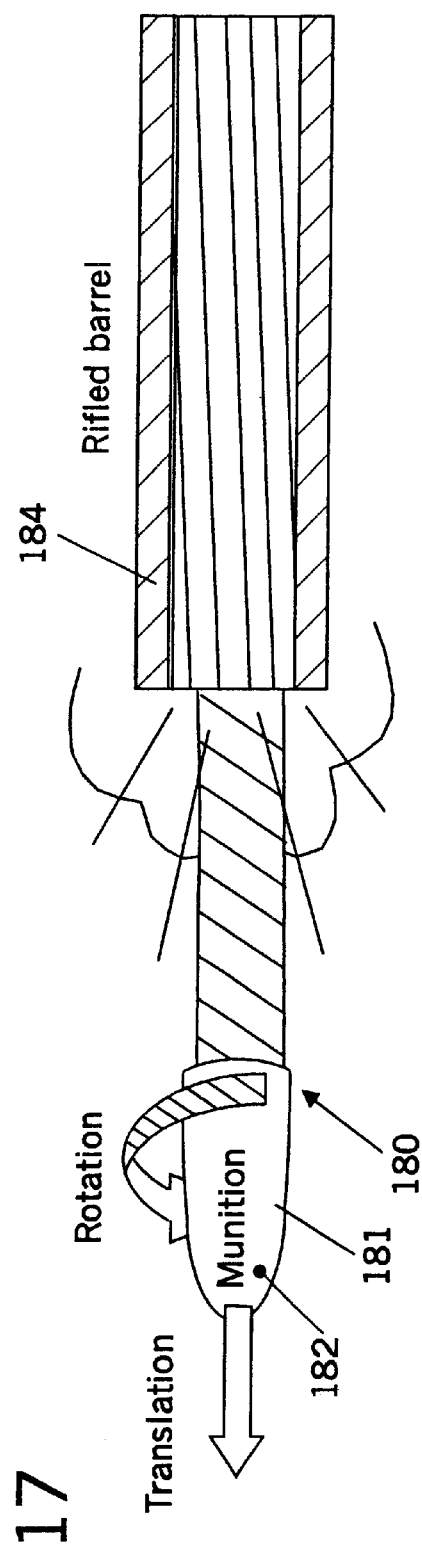
FIG. 17 is a perspective view of a self-guided device of the present invention configured for launching from a firearm.

A munitions HTD can be constructed with simple solid state electronics and actuators or other rotation-inducing units that can survive being fired from artillery, mortars, or rifles, and that can be used to modulate $\omega$ to steer the round. Note that many munitions are rifled and, therefore, the rifle's barrel induces $\omega_\parallel$. This can be exploited in a self-steering munition. Such a device can improve the accuracy of artillery rounds or rotating mortar rounds by having a soldier on the ground illuminate a target, such as the corner of a building, to ensure that all incoming rounds strike only that section. As shown in FIG. 17, the device 180 is equipped with an IR photosensor 182, mounted toward the front, off center, and with at least one actuator (not shown). Thus as the round travels, the photosensor 182 rotates about an axis parallel to the direction of travel.

As the device 180 is fired, it travels with translational velocity V and rotational velocity ω. The rotational velocity can be broken into two components, one parallel ($\omega_\parallel$) and one perpendicular ($\omega_\perp$) to the translational velocity (see FIG. 3b for an example of rotational velocity vectors.) It is important to keep in mind that the device actually travels in the direction of ω, not V. However, for most rounds these are nearly coaxial because $\omega_\parallel$ is small. When the device 180 is approximately pointing toward an illuminated target, such as the side of a building, then the photosensor 182 will detect the light reflected from the target. If the spinning round is not pointed directly toward the target, the photosensor 182 will emit a signal to the actuator controlling ω that is stronger when facing the target and weaker when facing away from the target. This oscillating signal is, thus, an error signal indicating whether the device 180 is pointed at the target— the larger the amplitude of the oscillation the poorer the aim. When the device 180 is pointed at the target, the amplitude of the oscillation drops to zero. Thus, the device 180 will automatically turn until it is pointed toward the source of the signal whereby the amplitude of the error signal drops to zero (and the time derivative of the signal drops to zero).

Such a device can be used to improve the accuracy of anti-aircraft rounds (fired from the surface or in the air) either by illuminating the aircraft from the ground or by using infra-red sensors that steer the round toward the engines of the aircraft. Alternatively, it can improve the accuracy of artillery, rifles, and rotating mortar rounds by illuminating targets. This could be especially important in urban battlegrounds. Moreover, it can replace wire-guided missiles used for anti-tank warfare; for example, the wires can be replaced by an IR laser. Further, space constrained sabot-carried sub-caliber rounds could still possess PGM capability.

In this configuration, the following advantages can be realized:
(1) simpler and fewer parts, yielding lower cost per unit, greater reliability in the field, and a smaller volume allowing it to fit a wider range of projectile sizes;
(2) capable with existing artillery and launchers, decreasing the cost and time to field functional units and simplifying the training of personnel;
(3) possible that the sensor, circuitry, and actuator can be built into a small device designed to fit as a surface inlay into a projectile, permitting field-selectable guidance for multiple signals. Conversely, building multiple sensors into a single package can permit selection in the field by simply turning a switch. The whole package could be solid state, including a piezoelectric actuator;
(4) guidance mechanism is robust and degrades proportionally with signal-to-noise (even if the signal is lost, the projectile will still be as effective as conventional aiming permits);
(5) can achieve a rifle-sized PGM (i.e., a "smart" bullet).

3. Locating an Object Emitting a Signal

A device can detect the location of an object based on a signal emitted by that object. After locating the object, the device can then emit a signal that indicates the object has been located and provide its location. As examples, the object/signal can be: a crack in a nuclear reactor container (radiation detected); a human diver (acoustic noise detected); a lost vessel (an acoustic beacon detected); a submarine (an acoustic or magnetic signal); a leaky underwater pipe (a chemical detected); an underground mineral or petrochemical deposit (chemical or deformation of Earth's magnetic field detected); or a sunken ship (magnetic signal detected).

4. Locating an Object Reflecting a Signal

A device detects the location of an object based on a signal reflected off that object after emission from a source. The device then emits a signal that indicates the object has been located. Different object/signal combinations can include: a diver (sonar or light as the reflected signal—for location of intruders); an underwater vessel (sonar or light as the reflected signal—for location of intruders or of sunken vessels); an underwater explosive mine (sonar or light as the reflected signal—for demining efforts); buried objects underwater (sonar as the reflected signal—for location of buried assets); or even a running person (light as the reflected signal—for a thrown object, such as a football).

5. Microscopic Robot

Helical Klinotaxis was first described by Crenshaw for microorganisms (diameters of about 10 $\mu$m). It is thus proven in microscopic systems. A lower size limit of 5 $\mu$m is imposed by rotational diffusion because the direction of motion of a self-motile object is rapidly randomized by thermal collisions with water molecules when the object's dimension falls below about 5 $\mu$m. Proof that objects as small as 10 $\mu$m use HK is provided by living organisms, such as the ciliate, *Paramecium caudatum*, which orients to chemical concentration gradients via HK. An HTD can be manufactured as a microelectromechanical system (MEMS) having features with micrometer-sized dimensions. The HTD MEMS can be small enough to be injected via a hyperdermic needle in large numbers into a living body for the purpose of locating diseased tissue or organs and acting as a delivery device for a curative or therapeutic agent. For example, a MEMS HTD detects the presence of a chemical, as from a tumor, in a living body and orients to the tumor. Alternatively, living organisms that already use Helical Klinotaxis can be genetically selected, bioengineered, or genetically modified, to locate desired targets for practical purposes, such as bioremediation or bioindicators of water-borne pathogens and chemicals.

6. Aircraft Safety Systems

When an aircraft is in a flat spin or in a "graveyard spiral," normal attitude control has been lost. Fortunately, an aircraft experiencing these deadly conditions also qualifies as an HTD, and so control may be restored by the present inventions described in Section A. Most aircraft already possess the requisite sensor to detect cyclic rotation, namely a compass and an altimeter (see Section A.7). The aircraft also possess translation- and rotation-modulating means in the form of control surfaces and engine(s). The appropriate software downloaded into the flight control computer would permit the automatic detection of these dangerous conditions and the subsequent invocation of software routines that modulate V and ω as functions of magnetic North and altitude to recover attitude control. Advantages of this method include zero mass and space penalty for the benefit, leveraging existing systems for new functionality, deadman recovery, and ease and speed of upgrade for existing aircraft.

7. Use of Multiple Devices

Aquatic robotic HTDs can now be cheaply constructed that autonomously orient to an external signal (for example, radiation sources, a chemical concentration gradient, or a depth gradient). Exemplary devices are illustrated in FIGS. 11 through 16, 19 and 20. Such a device will typically have an outer shell that houses a sensor, a control module, a battery, and a motor. Preferably, these devices are relatively small; theoretically, HTDs can be as small as $5\times10^{-6}$ m (5 $\mu$m). The devices may be constructed so that one or more individual devices within a "swarm" can communicate with other devices in the swarm to effect more complex actions. For example, the device can carry an acoustic beacon to which other devices respond. The response can be to orient to and approach the source of the beacon or to move away from the Source of the beacon. Alternatively, the devices can be constructed to communicate with a separate device, such as a base station. Several behaviors can emerge from Such Simple communications.

a. Reducing the Incidence of False-positives Through Signal Amplification and Positive Feedback Consider a school of devices, each possessing a sensor ($S_{Mag}$) for magnetic objects, an acoustic beacon, and a sensor ($S_{Ac}$) for the acoustic signal. The beacon is designed such that it projects a detectable signal over a much longer distance than the signal anticipated from the magnetic object. The search strategy for each device is: "swim until $S_{Mag}$ or $S_{Ac}$ detects a signal; if only one sensor detects a signal, then orient to that signal; $S_{Mag}$ has priority over $S_{Ac}$ when both sensors detect signals." The devices arc scattered over an arena and start swimming, either in random directions or using a pre-patterned search. If a device detects a magnetic object, it emits the acoustic beacon while ignoring its own $S_{Ac}$ and continues to orient to the magnetic signal. All devices that have not yet found a magnetic object, but can detect the acoustic beacon from the emitting device, converge on the emitting device. If the incoming devices also detect a magnetic object, then each emits its own beacon. As this "beacon effect" recruits more and more devices to the successful contact areas, the strength of the acoustic signal increases, thereby improving the chance that the greatest number of robots make contact with the magnetic signal. This is a positive feedback loop. A signal that increases in amplitude indicates that it is not a false positive. Any spurious "positive" contacts with a magnetic signal are automatically checked out and rejected because, although other devices are recruited to the site, only the device with the false positive will emit the acoustic beacon.

b. Maintaining Even Spacing Between Devices to Improve Coverage

Figure 23:
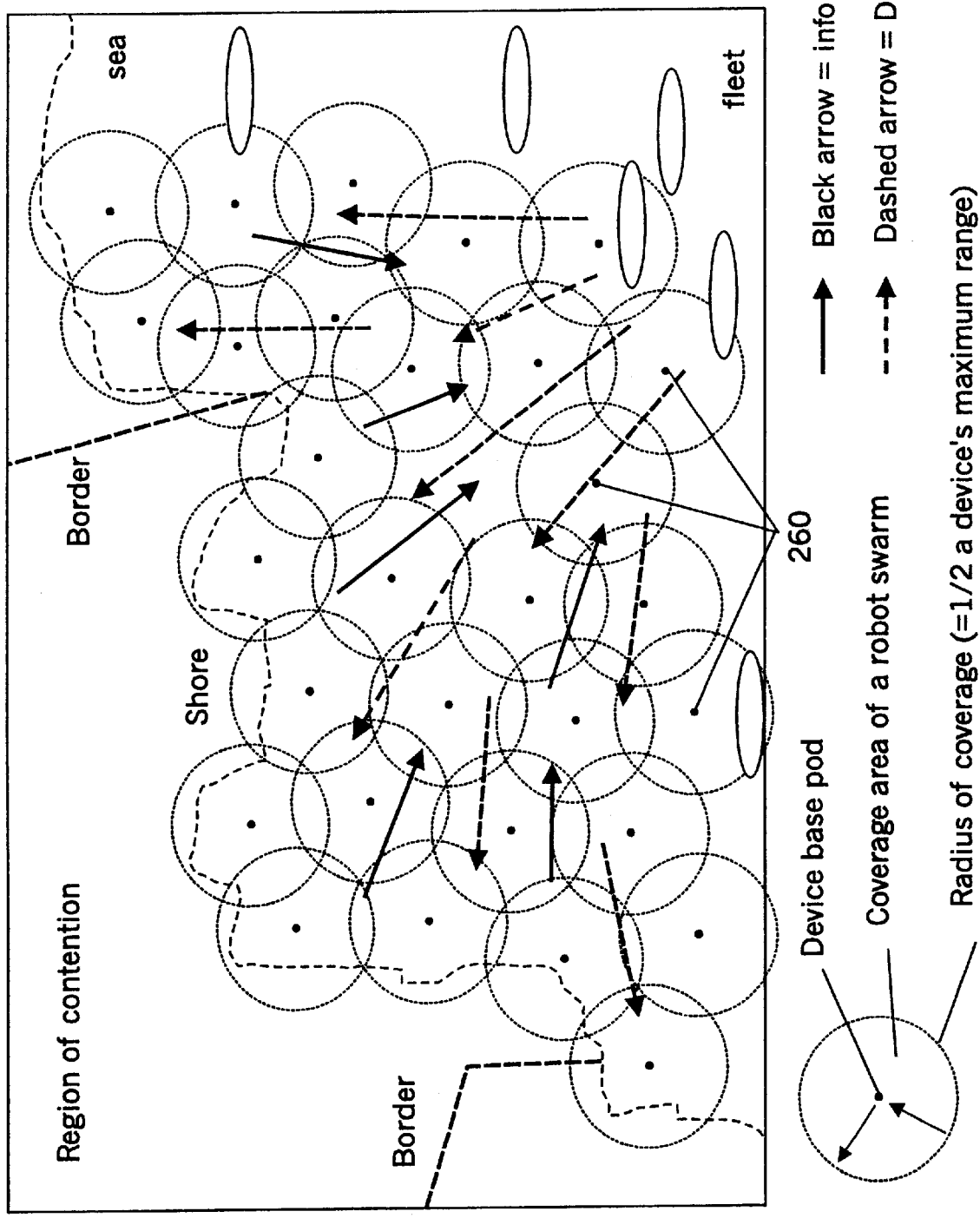
FIG. 23 is a plan view of an exemplary coastline that can be patrolled with a plurality of devices of FIGS. 11 through 16, 19 and 20.

The beacon in the previous example could be used in other ways. By simply orienting away from the acoustic beacon, devices avoid regions where a signal has been detected to maximize the search area. Similarly, the acoustic beacon could be emitted at all times and used to space devices, thereby reducing overlap in the search area and minimizing the search time for a given area. Density control, a related issue, could be achieved by choosing a threshold value for switching between behavior (a) above and (b) here.

c. Increasing Mission Life Ease of Telemetry and Swarm Capabilities Through Use of a Base Station Swarms of devices can be released along with unmanned base stations or pods 260 (see FIG. 23). The base pods may have their own power and/or propulsion; they may have solar collectors to recharge batteries; they may be equipped with transceivers to transmit data or receive new instructions. The pods may lie on a seabed or riverbed, or float at a given depth, and the devices can sortie from the pod. The devices would periodically return (via HK to a homing signal emitted by the pod). At the pod the devices can download data for processing by the pod and/or transmission; they can recharge their batteries for extended life; and/or they can receive new search instructions. Any number of devices can be traveling to and from the pod simultaneously, maintaining continuous coverage in an area with a radius about equal to ½ the range of a device. For example, if the device's range is ~3 km, then one pod can cover a circular area of ~7 km$^2$. Depending on the pod's (or a remote human commander's) evaluation of the situation, the pod may release devices in whatever numbers and directions appear appropriate, using a selectable palette of orientation strategies. With individual numbering of devices, the pod can account for lost devices, substitute replacements, and even transmit a need for new devices to be dropped in. After a mission, pods may return home with devices inside, or the pod can recall them, close up, and sink to reduce observability. Also, pods might sit for months on the bottom until the devices are needed, as determined by an internal timer, a remotely transmitted signal, or the presence of a trigger signal such as the sound of a ship's screws or detection of a chemical. Notably, such arrays of pods and HTDs can be deployed as described above for the detection of foreign vessels or divers along a coastline.

Pods can also serve as a relay network, or "superschool," for exchanging devices between many pods. One can then manage device density in an area covered by the pods, adapting to changing needs, or feed devices into an area to replace lost units, or monitor borders, including moving or expanding such borders by adding pods and/or robots while maintaining continuous spatial and temporal coverage. Pod spacing is then a function of pod mobility and/or device range; individual devices can traverse the entire network if pods are located at distances just under maximum device range. By relaying devices via a pod network, device density per unit area can be increased until it becomes limited only by the rate at which a pod can cycle devices. A superschool of thousands of pods and millions of devices can inhabit an entire naval theater and reconfigure as required, enhancing surface and subsurface fleet operations. The present invention permits the mass production of large numbers of effective, inexpensive devices with capabilities heretofore only witnessed in much more complex, expensive vehicles.

d. Distant Insertion of Devices Via Motile Pods

In the previous example, the pods are stationary or drifting. They can, however, be fast-moving, such as a torpedo launched at a great distance from the search site. Upon reaching the site, the pod can remain stationary and release the devices. Upon completion of the search, the devices return to the pod and can be carried back to the launch platform. This strategy can be used for covert placement of devices or for returning samples, especially hazardous samples, from remote sites. In this latter case, devices can open, fill, and close a small storage tank when in contact with a signal of interest (eg. chemical or biological agent).

e. Distributed Ordnance

Devices can be used to covertly carry ordnance to a target. For example, if hundreds of low-observable small devices gather at a single, vital spot on a guarded asset (ship, dock, or up effluent pipes to the source) and wait for a special signal, one could quietly deliver large quantities of explosives. Individual devices can locate the target, if a suitable signal is present. When sufficient numbers of devices accumulate at the target, they can simultaneously detonate.

f. Mine Countermeasures

If a suitable signal emanates from underwater mines, devices can locate the mines. When released in mass over a search area, or inserted by a torpedo, a swarm of devices can locate single mines for avoidance or removal. Alternatively, devices can detonate the mine or carry a charge sufficient to destroy the mine. Conversely, simply mapping the edges of submerged mine fields would have utility in both times of conflict and peace.

The invention will now be described more particularly in the following non-limiting example.

EXAMPLE

1. General Description of the M3 Device

Figure 20:
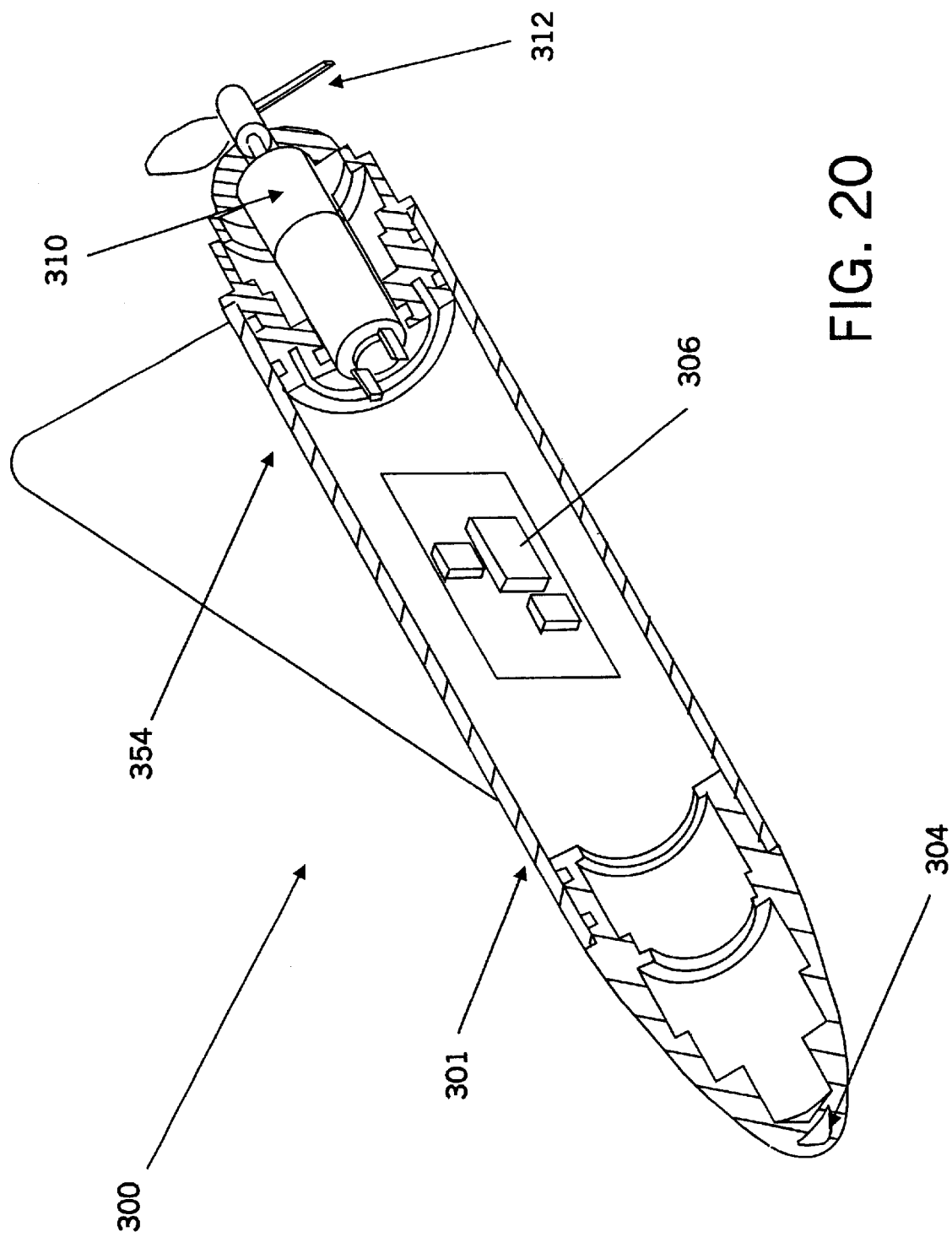
FIG. 20 is a schematic cutaway perspective view of an M3 helically traveling device.

A prototype HTD (hereinafter "the M3"), shown in FIG. 20, is a specific embodiment of an HTD that orients to a light. It is a self-orienting, underwater device. The M3 uses only one actuator, coupled with the HIWAD algorithm, to demonstrate that a 6-degree of freedom (6-DOF) HTD can orient to a signal field in 3D space.

As shown in FIG. 20, the M3 300 comprises: a housing 301, a motor 310, a propeller 312, a delta fin 354, a sensor 304, and a controller 306. The housing 301 holds the various components of the M3. The motor 310 rotates the propeller 312. The speed of rotation of the propeller 312 is variable, and is controlled by an actuating signal (S).

The propeller 312 induces both translation and rotation. The motion of the propeller 312 around its axis generates thrust on the housing 301 of the M3. This is the mechanism that induces V. In this case, the counterclockwise rotation of the propeller 312 around its axis generates a clockwise reaction torque on the housing 301 of the M3. This is the mechanism that induces $\omega_\parallel$.

The delta fin 354 also induces rotation. Specifically, the interaction of the fluid with the delta fin 354 generates a torque on the M3. This mechanism induces $\omega_\perp$.

The sensor 304 measures the value of a signal field, which is light in this case. Other signal fields and appropriate sensors can be used. The result of the measurement performed by the sensor 304 is sent to the microprocessor 306. The microprocessor 306 uses the signal sent to it by the sensor to modulate the speed of rotation of the propeller 312 attached to the motor 310.

As described above, the M3 is a one-actuator device. Rotation and translation are controlled by the voltage applied to the motor 310. Changing the voltage applied to the motor 310 concomitantly changes the thrust and torque provided by the propeller 312.

2. Modeling of the M3 Device

The dynamics of the M3 have been mathematically modeled, and the behavior of the model closely matches the behavior of the M3. Input to the model is the amplitude of the motor-actuating signal (S). The propeller 312 provides thrust (T) and reaction torque ($\tau$) as functions of S. The reaction torque induces $\omega_\parallel$. The thrust induces V, which is approximately parallel to the long axis of the M3. The interaction of the delta fin 354 with the fluid generates a torque that induces $\omega_\perp$. Mathematically, these interactions can be described with a set of coupled differential equations:

$$\frac{dV}{dt} = T(S) - AV^2$$

$$\frac{d\omega_\parallel}{dt} = \tau(S) - B\omega_\parallel^2$$

$$\frac{d\omega_\perp}{dt} = C\omega_\perp^2 - DV^2.$$

Figure 21A:
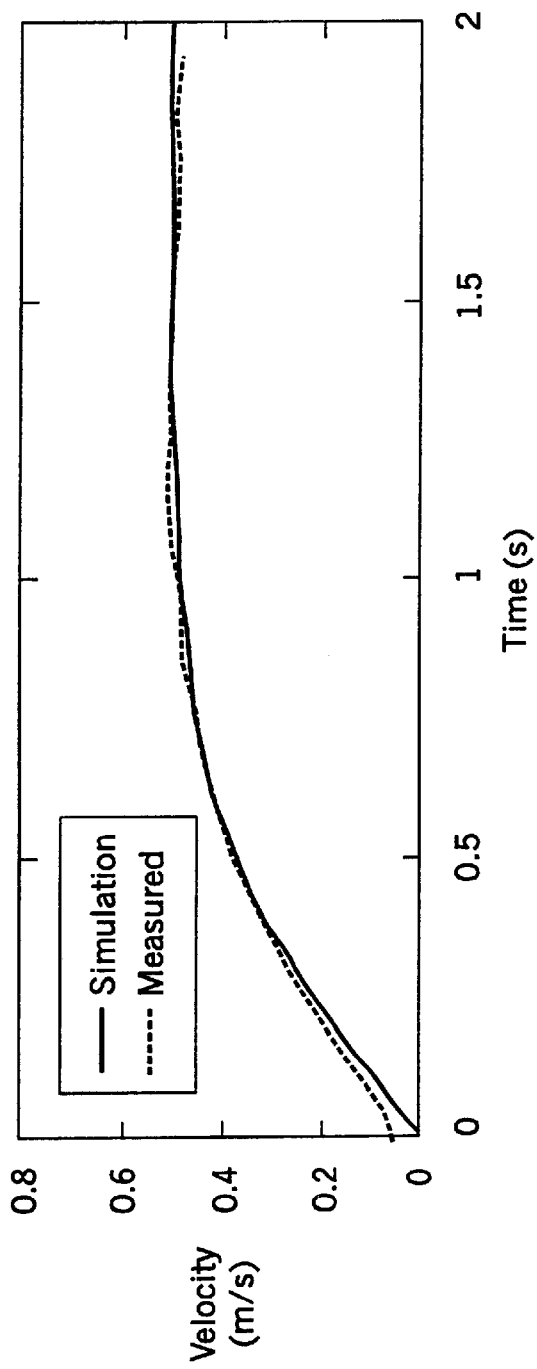
Figure 21B:
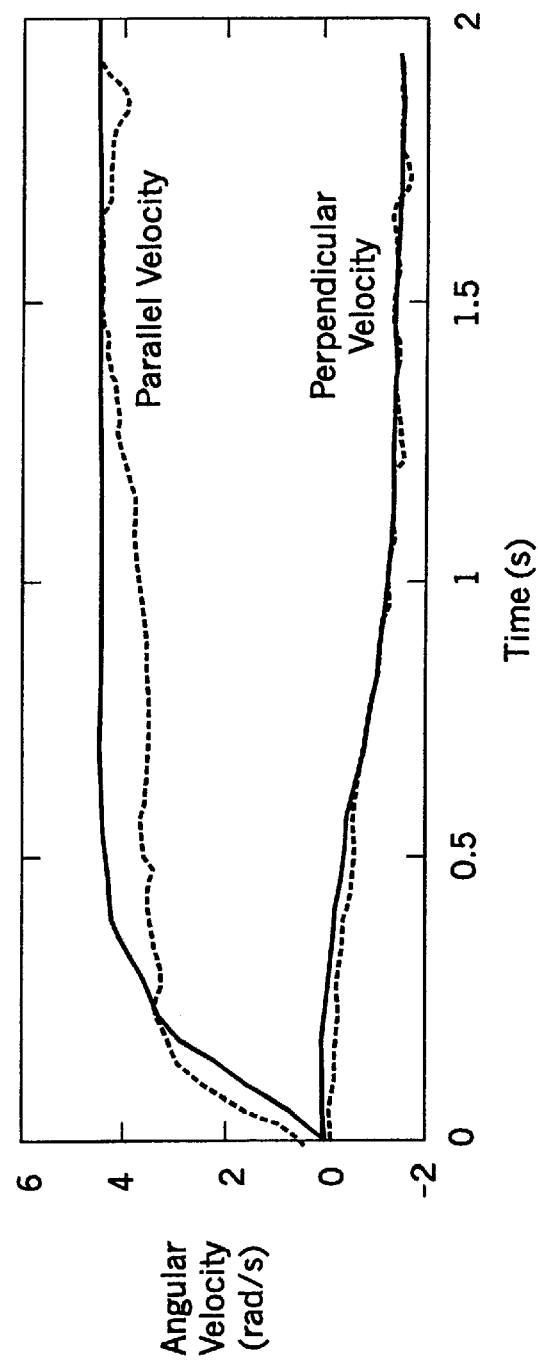
FIG. 21b shows translational velocity V and rotational velocity ω as the propeller switches from on to off.

The drag coefficients A, B, C, and D, depend on the details of the shape of the M3. FIG. 21 presents the time development of V, $\omega_\parallel$, and $\omega_\perp$, for a free-swimming M3 that is initially at rest (data obtained by 3D tracking of a freely swimming M3; predicted values come from our computed simulations). The predicted values closely match the actual values.

Figure 8A:
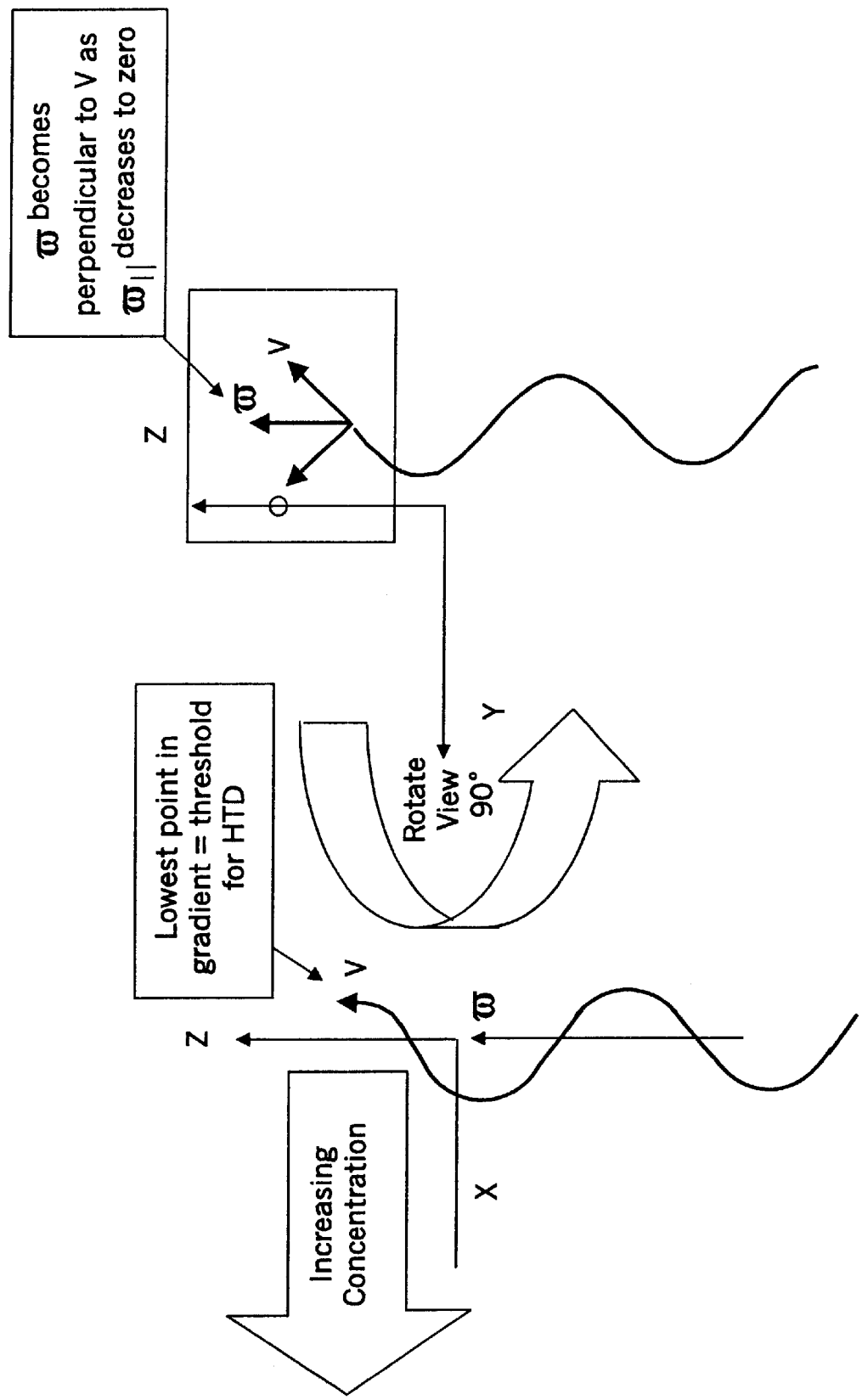
As shown in FIG. 8a, a device moves with the axis of its helical trajectory K initially perpendicular to ∇C. As the device moves, the chemical concentration it encounters oscillates. The point on the helical trajectory that is furthest down the gradient is a threshold point. On reaching this point, V, ω, and $\omega_\perp$ are aligned perpendicular to ∇C (FIG. 8a). On reaching this threshold, $\omega_\|$ decreases to zero, causing ω to rotate perpendicular to V and to ∇C (FIG. 8a). This decrease in $\omega_\|$ causes V to rotate more nearly parallel to ∇C, but ω has not aligned more nearly parallel to ∇C (FIG. 8a and 8b). $\omega_\|$ then returns to its original value, causing ω to align more nearly parallel to ∇C because V has been aligned more nearly parallel to ∇C (FIG. 8c). Thus, although the initial response does not align ω more nearly parallel to the signal field, the integral of the change in ω over the entire response does align ω more nearly parallel.
Figure 8C:
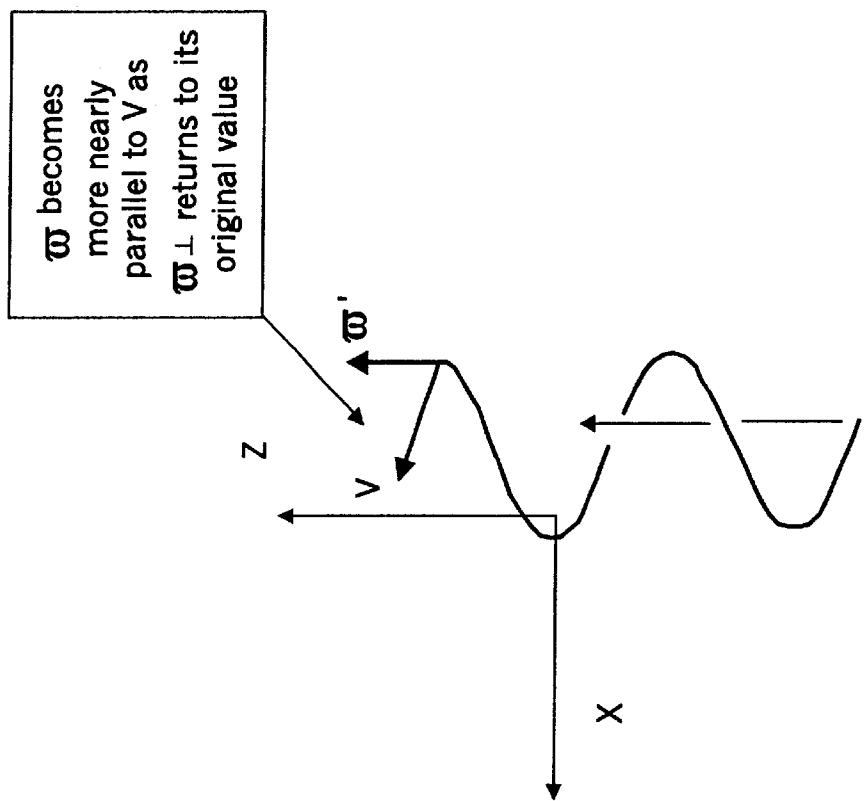
FIG. 8 is a series of schematic diagrams that illustrate the orientation of a device to a chemical concentration gradient ∇C. This is similar to the mechanism illustrated in FIG. 7, except the change in the direction of ω is generated by changes in $\omega_\|$ rather than in $\omega_\perp$. Chemical concentration C increases in the positive X direction. In this example, $\omega_\|$ decreases to zero when C drops below a threshold then, after a brief time, returns to its original value.
Figure 8B:
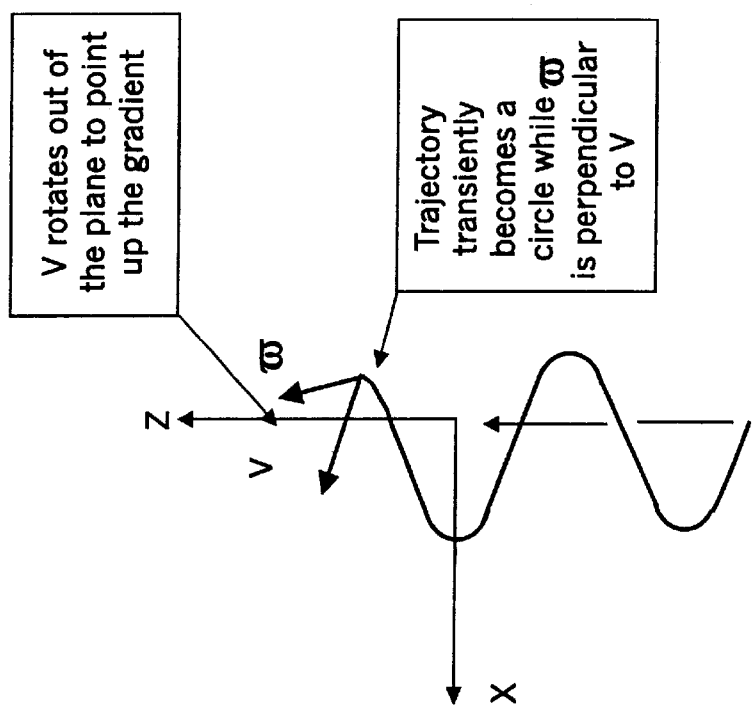

Importantly, V, $\omega_\parallel$, and $\omega_\perp$ change at different rates when the propeller 312 is switched from on to off and, again, from off to on. When the propeller 312 switches from off to on V and $\omega_\parallel$ increase more rapidly than $\omega_\perp$. This causes $\omega$ to rotate with respect to the M3's body axes, which causes the pitch angle ($\theta$) to change. When the propeller 312 switches from on to off, $\omega_\parallel$ decreases to zero very rapidly, while V and $\omega_\perp$ decrease more slowly. Again, this causes $\omega$ to rotate with respect to the M3's body axes, which again causes $\theta$ to change. In fact, the trajectory is nearly circular (2D) as the vehicle coasts with its propeller 312 off. Thus, switching the motor 310 off and then, after a delay, switching the motor 310 back on, permits a 2-state mechanism like that described in Section A.4.c (see FIG. 8).

3. The HIWAD Algorithm for the M3 Device

The M3, therefore, serves as an HTD compatible with a 2-state response to the signal field. The M3 utilizes a Helical Impulse With Asymmetric Drag algorithm (HIWAD) to determine when the states should switch.

Referring now to FIG. 22, the HIWAD algorithm is schematically illustrated. In general, the HIWAD algorithm is a discontinuous, state-based algorithm that includes two distinct states for the vehicle: State 1, which is a "Drive and Sample Mode"; and State 2, which is a "Turn and Sample Mode." The algorithm causes the sensor 304 in the device 300 to scan the signal field while the translation/rotation unit is engaged (Box 400). When, as shown in Box 410, the sensor detects an extremum (more particularly, the sensor detects the passage of an extremum), the controller waits for a phase lag (Box 420) and then arrests the translation/rotation unit (Box 430). When this occurs, $\omega_\parallel$ essentially ceases, but V decreases more slowly, and the presence of asymmetric fluid forces on the device, arising from the delta fin 354, induces $\omega_\perp$ causing the M3 to continue along a circular trajectory (Box 440). The sensor 304 continues to scan the signal field and search for an extremum (Box 450). Once an extremum is detected, the controller waits for a phase lag (Box 460) and then re-engages the translation/rotation unit (Box 470). This causes the device 300 to begin translating again, with the axis of its helical trajectory being more closely aligned with the signal field. These steps are described below in specific detail for a device designed to travel toward maximum light intensity within a fluid.

The kinematics resulting from the application of HIWAD algorithm to the M3 are summarized in Table 1. It is important to note that, as discussed in Sections A.5 and A.6, there may exist a time lag or phase lag during the transition from State 1 to State 2. Similarly, there may exist a time lag or phase lag during the transition from State 2 to State 1.

TABLE 1

| Algorithm State | Characteristics of Algorithm State |
| --- | --- |
| State 1 | The vehicle's thrust unit and reaction-torque unit is active (causing V > 0), the vehicle is moving in a helix where V~$V_i$ and $\omega = \omega_\parallel + \omega_\perp$, and a sensor is sampling the signal field. The sensor data is mapped and an extremum of the signal (maximum or minimum) is identified. When the vehicle's (helical) motion causes the sensor to detect the passing of the extremum, the vehicle enters State 2 |
| State 2 | The vehicle's thrust unit and reaction-torque unit is arrested and the vehicle moves in a pattern where, as described in Section C.4.c, V →0, $\omega_\perp$ → 0, $\omega_\parallel$~0 - an approximately circular trajectory. The sensors continues scanning the signal field. The sensor data is again mapped and an extremum (maximum or minimum) is identified. When the vehicle's (circular) motion causes the sensor to detect the passing of the extremum the vehicle returns to State 1. |

Those skilled in the art will appreciate that variations of the HIWAD algorithm may also be suitable for use with the present invention. For example, the algorithm may modulate ω by smoothly varying propeller speed (and thus thrust and reaction torque) rather than by disengaging the thrust/reaction torque unit entirely (this would be more like the mechanism described in Section A.4.a). Also, the algorithm may cause a rotation-inducing device (such as a retractable fin or a laterally-mounted thruster) to modulate ω.

4. Testing of the M3 Device

A series of tests have been conducted in closed-water facilities to gauge the success of the HIWAD HK algorithm and the M3. The purpose of these tests was to evaluate whether an M3 can direct itself to a target that generates a signal field. The target for these tests was an underwater light. All tests were documented on videotape.

The tests that are documented in the videotape were structured as follows. For all trials, the M3 was released into a water tank from a jig at a distance of 5 to 10 meters from the light. The M3's initial pose was sufficiently random that the M3 could not travel directly to light. Hence, the vehicle needed to make corrections along the way to intercept the light source. At least 10 replicates of four random starting poses were completed in the test. This yields 40 total trials. The ability of the M3 to track toward the light was measured by the amount of time it took for the M3 to intercept the light within three minutes. The trial ended earlier if the M3 passed within 1.5 meters of the light. A trial that ended at three minutes implied that the M3 never intercepted the light.

As observed on the videotape, the M3 intercepted the light 39 times out of 40. Additionally, the M3s that intercepted the light did so well under 3 minutes. The average time to intercept the light was 31 s. The M3 that did not respond to the photosensor almost always failed to intercept the light in 3 minutes.

The foregoing is illustrative of the present invention and is not to be construed as limiting thereof. Although exemplary embodiments of this invention have been described, those skilled in the art will readily appreciate that many modifications are possible in the exemplary embodiments without materially departing from the novel teachings and advantages of this invention. As such, all such modifications are intended to be included within the scope of this invention.

That which is claimed is:

1. A self-orienting device for travel through a fluid medium, comprising:
   a housing;
   a sensor mounted to said housing that is sensitive to a signal field and configured to produce a signal responsive to the signal field;
   a translation-inducing unit associated with said housing;
   a rotation-inducing unit attached to said housing;
   said translation-inducing unit and said rotation-inducing unit being configured such that said housing travels along a helical trajectory having an axis and is free to rotate about the axis responsive to the rotation-inducing unit; and
   a controller operably associated with said sensor for controlling the output of said translation-inducing unit and said rotation-inducing unit, said controller being configured such that it receives the signal from said sensor and, responsive to said signal, can simultaneously control the output of said translation-inducing unit and said rotation-inducing unit without requiring a system controlling attitude of the device.

2. The device defined in claim 1, wherein said device is configured for travel through air.

3. The device defined in claim 1, wherein said device is configured for travel through water.

4. The device defined in claim 1, wherein said sensor is sensitive to a signal field selected from the group consisting of: temperature gradient, depth gradient, chemical gradient, and light.

5. The device defined in claim 1, wherein said rotation-inducing unit comprises a rotating member that rotates about an axis that is non-coincident with the axis of the helical trajectory.

6. The device defined in claim 1, wherein said rotation-inducing unit comprises a mass eccentrically mounted within said housing.

7. The device defined in claim 1, wherein said rotation-inducing unit comprises at least one thruster mounted to said housing to provide thrust along an axis that is non-coincident to the axis of the helical trajectory.

8. The device defined in claim 1, wherein said rotation-inducing unit comprises one or more fins asymmetrically mounted to said housing.

9. The device defined in claim 1, wherein said housing is configured to be asymmetrical about the axis of the helical trajectory.

10. The device defined in claim 1, further comprising a payload contained within said housing selected from the group consisting of: explosives; neutralizing agents; dyes; and signaling units.

11. The device defined in claim 1, further comprising a data collection unit.

12. The device defined in claim 1, further comprising a data transmission unit.

13. The device defined in claim 1, further comprising a signal transmitter.

14. The device defined in claim 1, further comprising a signal receiver configured to receives a signal that differs from the signal generated by the sensor.

15. A self-orienting device for travel through a fluid medium, comprising:
    a housing;
    a sensor mounted to said housing that is sensitive to a stimulus vector field and configured to produce a signal responsive to the stimulus vector field;
    a thrust unit associated with said housing;
    a torque-inducing unit attached to said housing;
    said thrust unit and said torque-inducing unit being configured such that said housing travels along a helical path having an axis and is free to rotate about the axis responsive to the torque-inducing unit; and
    a controller operably associated with said sensor for controlling the output of at least one of said thrust unit and said torque-inducing unit, said controller being configured such that it receives the signal from said sensor and, responsive to said signal, can simultaneously control the output of at least one of said thrust unit and said torque-inducing unit without requiring a system controlling attitude of the device.

16. The device defined in claim 15, wherein said device is configured for travel through air.

17. The device defined in claim 15, wherein said device is configured for travel through water.

18. The device defined in claim 15, wherein said sensor is sensitive to a signal field selected from the group consisting of: temperature gradient, depth gradient, chemical gradient, and light.

19. The device defined in claim 15, wherein said torque-inducing unit comprises a rotating member that rotates about an axis that is non-coincident with the axis of the helical trajectory.

20. The device defined in claim 15, wherein said torque-inducing unit comprises a mass eccentrically mounted within said housing.

21. The device defined in claim 15, wherein said torque-inducing unit comprises at least one thruster-providing unit mounted to said housing to provide thrust along an axis that is non-coincident to the axis of the helical trajectory.

22. The device defined in claim 15, wherein said torque-inducing unit comprises one or more fins asymmetrically mounted to said housing.

23. The device defined in claim 15, wherein said housing is configured to be asymmetrical about the axis of the helical trajectory.

24. The device defined in claim 15, further comprising a payload contained within said housing selected from the group consisting of: explosives; neutralizing agents; dyes; and signaling units.

25. The device defined in claim 15, further comprising a data collection unit.

26. The device defined in claim 15, further comprising a data transmission unit.

27. The device defined in claim 15, further comprising a signal transmitter.

28. The device defined in claim 15, further comprising a signal receiver configured to receives a signal that differs from the signal generated by the sensor.

29. A method of steering a device in three dimensions in a fluid, comprising the steps of:
   providing a device comprising:
      a housing;
      a sensor mounted to said housing that is sensitive to a signal field and configured to produce a signal responsive to the signal field;
      a translation-inducing unit associated with said housing;
      a rotation-inducing unit attached to said housing;
      said translation-inducing unit and said rotation-inducing unit being configured such that said housing travels along a helical trajectory having an axis and rotates about the axis; and
      a controller operably associated with said sensor for controlling the output of at least one of said translation-inducing unit and said rotation-inducing unit, said controller being con figured such that it receives the signal from said sensor and, responsive to said signal, controls the output of at least one of said translation-inducing unit and said rotation-inducing unit;
   releasing the device into a fluid such that the device travels along a helical trajectory;
   detecting a signal field with the sensor;
   transmitting a signal to the controller from the detector that is indicative of the magnitude of the signal field; and
   transmitting a signal to at least one of the translation-inducing unit and the rotation-inducing unit to alter the helical trajectory of the device.

30. The method defined in claim 29, wherein said second transmitting step comprises transmitting a signal to the translation-inducing unit to disengage from inducing translation.

31. The method defined in claim 30, wherein said detecting step comprises detecting an extremum in the signal field.

32. The method defined in claim 31, comprising repeating the detecting step and the first transmitting step after performance of the second transmitting step, and further comprising the step of engaging the translation-inducing unit after the sensor detects a second extremum in the signal field.

33. A device for locating an object in a three-dimensional fluid volume, comprising:
   a housing;
   a first sensor mounted to said housing that is sensitive to a stimulus vector field emitted by or reflected from the object and configured to produce a signal responsive to the stimulus vector field;
   a second sensor sensitive to a signal beacon mounted to said housing;
   a signal beacon unit mounted to said housing;
   a translation-inducing unit associated with said housing;
   a rotation-inducing unit attached to said housing;
   said translation-inducing unit and said rotation-inducing unit being configured such that said housing travels along a helical path having an axis and rotates about the axis; and
   a controller operably associated with said second sensor for controlling the output of at least one of said translation-inducing unit and said rotation-inducing unit, said controller being configured such that it receives the signal from said second sensor and, responsive to said signal, controls the output of at least one of said translation-inducing unit and said rotation-inducing unit.

34. The device defined in claim 33, wherein said signal beacon unit is an acoustical beacon unit, and said second sensor is sensitive to an acoustical beacon emitted from the acoustical beacon unit.

35. A method for locating an object in a three-dimensional fluid volume, comprising the steps of:
   releasing a plurality of devices into the three-dimensional fluid volume and allowing each device to travel along a helical trajectory, each of said devices comprising:
      a housing;
      a first sensor mounted to said housing that is sensitive to a signal field emitted by or reflected from the object and configured to produce a signal responsive to the signal field;
      a second sensor sensitive to a signal beacon mounted to said housing;
      a signal beacon unit mounted to said housing;
      a translation-inducing unit associated with said housing;
      a rotation-inducing unit attached to said housing;
      said translation-inducing unit and said rotation-inducing unit being configured such that said housing travels along a helical trajectory having an axis and rotates about the axis; and
      a controller operably associated with said second sensor for controlling the output of at least one of said translation-inducing unit and said rotation-inducing unit, said controller being configured such that it receives the signal from said second sensor and, responsive to said signal, controls the output of at least one of said translation-inducing unit and said rotation-inducing unit; and
   after a first device detects the object, transmitting a signal with the beacon unit to indicate the location of the object to the remaining devices.

36. A method for steering a device in a three-dimensional fluid volume, comprising the steps of:
   propelling a device along a helical path;
   detecting a signal field with an on-board sensor; and
   modifying the helical path responsive to the detection by the sensor to align the rotational velocity vector of the device toward a target.

37. The method defined in claim 36, wherein said target is an object.

38. The method defined in claim 36, wherein said target is a direction.

* * * * *